(12) United States Patent
Ananda et al.

(10) Patent No.: US 12,177,046 B2
(45) Date of Patent: *Dec. 24, 2024

(54) MODEM FRAMEWORK FOR APPLICATION-SPECIFIC BASEBAND CUSTOMIZATION AT AN END USER

(71) Applicant: QUALCOMM Incorporated, San Diego, CA (US)

(72) Inventors: Raghavendra Shyam Ananda, Hyderabad (IN); Ganesh Nagamani, Hyderabad (IN); Srikanth Menon, Bangalore (IN); Raghuveer Ramakrishna Srinivas Tarimala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,833

(22) Filed: May 18, 2023

(65) Prior Publication Data

US 2023/0291622 A1    Sep. 14, 2023

Related U.S. Application Data

(63) Continuation of application No. 17/191,201, filed on Mar. 3, 2021, now Pat. No. 11,695,598.

(51) Int. Cl.
*H04L 25/03* (2006.01)
*H04L 67/303* (2022.01)

(52) U.S. Cl.
CPC .. *H04L 25/03929* (2013.01); *H04L 25/03165* (2013.01); *H04L 25/03184* (2013.01); *H04L 67/303* (2013.01)

(58) Field of Classification Search
CPC ......... H04L 25/03929; H04L 25/03165; H04L 25/03184; H04L 67/303
(Continued)

(56) References Cited

U.S. PATENT DOCUMENTS 10,116,481 B2    10/2018 Kim et al.
11,695,598 B2 *   7/2023 Ananda ............... H04W 4/70
                                                   375/262
(Continued)

FOREIGN PATENT DOCUMENTS

WO    2018125686 A2    7/2018

OTHER PUBLICATIONS

International Search Report and Written Opinion—PCT/US2022/013876—ISA/EPO—May 9, 2022.
(Continued)

*Primary Examiner* — Don N Vo
(74) *Attorney, Agent, or Firm* — Arun Swain

(57) ABSTRACT

Methods, systems, and devices for wireless communications are described. In some systems, a device, such as an internet of things (IoT) device, may include a configuration or software (e.g., in baseband) that is common for multiple applications of the device. In some aspects, the device may select a setting for at least some if not each of a set of parameters associated with or defining a device profile of the device based on an application of the device. The device may perform a mapping procedure to map the settings for the parameters associated with the device profile to one or more baseband configurations or baseband handles and the device may customize the baseband of the device using the one or more baseband configurations. As such, the device may operate or communicate using the baseband that is customized based on the device profile and application of the device.

25 Claims, 12 Drawing Sheets

(58) Field of Classification Search
USPC .................................. 375/222, 223, 260, 262
See application file for complete search history.

(56) References Cited

U.S. PATENT DOCUMENTS

| | | |
|---|---|---|
| 2012/0196583 A1 | 8/2012 | Kindo |
| 2016/0124443 A1 | 5/2016 | Reda et al. |
| 2017/0123467 A1 | 5/2017 | Ignowski et al. |
| 2017/0192473 A1 | 7/2017 | Lee et al. |
| 2017/0302782 A1 | 10/2017 | Wang et al. |
| 2017/0347313 A1* | 11/2017 | Arora ................ H04W 52/0251 |
| 2019/0058711 A1 | 2/2019 | Zhu et al. |
| 2019/0215380 A1* | 7/2019 | Rykowski ............... G06F 3/048 |
| 2019/0356520 A1 | 11/2019 | Silverman et al. |
| 2020/0260376 A1 | 8/2020 | Islam et al. |
| 2020/0328839 A1* | 10/2020 | Zhang ................... H04W 72/51 |
| 2021/0243617 A1* | 8/2021 | Cooper ............. H04W 72/0453 |
| 2021/0250378 A1 | 8/2021 | Hu et al. |
| 2022/0286331 A1 | 9/2022 | Ananda et al. |

OTHER PUBLICATIONS

Motorola: "UL-MIMO with Antenna Gain Imbalance", TSG-RAN WG1 #56, R1-090795, Athens, Greece, Feb. 9-13, 2009, pp. 1-7.

* cited by examiner

MODEM FRAMEWORK FOR APPLICATION-SPECIFIC BASEBAND CUSTOMIZATION AT AN END USER

CROSS REFERENCE

The present application for patent is a continuation of U.S. patent application Ser. No. 17/191,201 by ANANDA et al., entitled "MODEM FRAMEWORK FOR APPLICATION-SPECIFIC BASEBAND CUSTOMIZATION AT AN END USER," filed Mar. 3, 2021, assigned to the assignee hereof, and expressly incorporated by reference herein.

FIELD OF TECHNOLOGY

The following relates to wireless communications, including a modem framework for application-specific baseband customization at an end user.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support a modem framework for application-specific baseband customization at an end user. Generally, the described techniques support better or more suitable operation of a device, such as an internet of things (IoT) device, based on a device profile of the device, which may be related to a functionality or a configuration based on a specific application of the device (e.g., an application to be run or that is running on a device). For example, the device, or a user of the device, may select a setting for at least some if not each of multiple parameters associated with (e.g., that define) the device profile of the device and the device may use a mapping procedure to select or otherwise determine one or more baseband configurations (e.g., baseband handles, such as actions or configurations that may be implemented to configure a baseband functionality of the device) that the device may use during operation. Such parameters associated with the device profile may include a power parameter, a performance parameter, a coverage parameter (such as a maximum coupling loss (MCL) parameter), or a mobility parameter, among other examples. Further, baseband configurations may refer to operational actions or configurations according to which the device may customize a baseband of the device and according to which the device may operate or communicate. As such, the device may tune or otherwise select the baseband configurations based on the settings for at least some if not each of the multiple parameters associated with the device profile (e.g., based on or using the mapping procedure) and may operate or communicate using the tuned or selected baseband configurations.

A method for wireless communication at a first device is described. The method may include selecting settings for a set of multiple parameters associated with a device profile of the first device based on an application of the first device, performing a mapping procedure to map the settings for the set of multiple parameters associated with the device profile to one or more baseband configurations, and communicating with a second device using the one or more baseband configurations based on performing the mapping procedure.

An apparatus for wireless communication at a first device is described. The apparatus may include a processor, memory coupled with the processor, and instructions stored in the memory. The instructions may be executable by the processor to cause the apparatus to select settings for a set of multiple parameters associated with a device profile of the first device based on an application of the first device, perform a mapping procedure to map the settings for the set of multiple parameters associated with the device profile to one or more baseband configurations, and communicate with a second device using the one or more baseband configurations based on performing the mapping procedure.

Another apparatus for wireless communication at a first device is described. The apparatus may include means for selecting settings for a set of multiple parameters associated with a device profile of the first device based on an application of the first device, means for performing a mapping procedure to map the settings for the set of multiple parameters associated with the device profile to one or more baseband configurations, and means for communicating with a second device using the one or more baseband configurations based on performing the mapping procedure.

A non-transitory computer-readable medium storing code for wireless communication at a first device is described. The code may include instructions executable by a processor to select settings for a set of multiple parameters associated with a device profile of the first device based on an application of the first device, perform a mapping procedure to map the settings for the set of multiple parameters associated with the device profile to one or more baseband configurations, and communicate with a second device using the one or more baseband configurations based on performing the mapping procedure.

In some examples of the method, apparatuses, and non-transitory computer-readable medium described herein, performing the mapping procedure may include operations, features, means, or instructions for referencing a table indicating a correspondence between the settings for the set of multiple parameters associated with the device profile and the one or more baseband configurations.

In some examples of the method, apparatuses, and non-transitory computer-readable medium described herein, the table indicates a correspondence between each permutation of settings for the set of multiple parameters associated with the device profile and a unique one or more baseband configurations.

In some examples of the method, apparatuses, and non-transitory computer-readable medium described herein, performing the mapping procedure may include operations, features, means, or instructions for performing a reinforcement learning procedure to adjust a mapping of the settings for the set of multiple parameters associated with the device profile to the one or more baseband configurations.

Some examples of the method, apparatuses, and non-transitory computer-readable medium described herein may further include operations, features, means, or instructions for receiving, from a modem of the first device, one or more communication metrics associated with the communicating with the second device using the one or more baseband configurations, where the one or more communication metrics may be based on the application running on the first device, and where performing the mapping procedure may include operations, features, means, or instructions for performing the reinforcement learning procedure to adjust the mapping of the settings for the set of multiple parameters associated with the device profile to the one or more baseband configurations based on the one or more communication metrics.

Some examples of the method, apparatuses, and non-transitory computer-readable medium described herein may further include operations, features, means, or instructions for receiving, from a modem of the first device, one or more network parameters associated with the communicating with the second device using the one or more baseband configurations, where performing the mapping procedure may include operations, features, means, or instructions for performing the reinforcement learning procedure to adjust the mapping of the settings for the set of multiple parameters associated with the device profile to the one or more baseband configurations based on the one or more network parameters.

Some examples of the method, apparatuses, and non-transitory computer-readable medium described herein may further include operations, features, means, or instructions for updating a setting for at least one of the set of multiple parameters associated with the device profile of the first device based on a second application of the first device, performing a second mapping procedure to map the updated settings for the set of multiple parameters associated with the device profile to a second one or more baseband configurations, and communicating with the second device using the second one or more baseband configurations based on performing the second mapping procedure.

Some examples of the method, apparatuses, and non-transitory computer-readable medium described herein may further include operations, features, means, or instructions for adjusting a value for at least one of the one or more baseband configurations based on the application of the first device, where communicating with the second device may be based on adjusting the value for the at least one of the one or more baseband configurations.

Some examples of the method, apparatuses, and non-transitory computer-readable medium described herein may further include operations, features, means, or instructions for receiving, via a user interface of the first device, an indication of the settings for the set of multiple parameters associated with the device profile, where selecting the settings for the set of multiple parameters associated with the device profile may be based on receiving the indication.

In some examples of the method, apparatuses, and non-transitory computer-readable medium described herein, the settings for the set of multiple parameters are selected based on an application program running on the first device.

In some examples of the method, apparatuses, and non-transitory computer-readable medium described herein, the set of multiple parameters associated with the device profile include a power parameter, a performance parameter, a coverage parameter, or a mobility parameter, or any combination thereof.

In some examples of the method, apparatuses, and non-transitory computer-readable medium described herein, the one or more baseband configurations include a beam scan time, a resynchronization time, a Doppler support adjustment, an enablement or disablement of a sleep mode, a page reliability performance metric, a measurement accuracy metric, an enablement or disablement of early termination, a sleep clock source, an enablement or disablement of connected mode discontinuous reception, a modem clock plan, a transmission control protocol acknowledgement delay timer adjustment, or an idle and sleep duration timer, or any combination thereof.

A method for wireless communication at a first device is described. The method may include selecting settings for a set of multiple parameters associated with a first device based on an application running on the first device, where selecting the settings defines a device profile for the first device based on the application, performing a mapping procedure to map the device profile to at least one baseband configuration from a number of available baseband configurations, and communicating with a second device using the one or more baseband configurations based on performing the mapping procedure.

An apparatus for wireless communication at a first device is described. The apparatus may include a processor, memory coupled with the processor, and instructions stored in the memory. The instructions may be executable by the processor to cause the apparatus to select settings for a set of multiple parameters associated with a first device based at least in part on an application running on the first device, where selecting the settings defines a device profile for the first device based on the application, perform a mapping procedure to map the device profile to at least one baseband configuration from a number of available baseband configurations, and communicate with a second device using the one or more baseband configurations based on performing the mapping procedure.

Another apparatus for wireless communication at a first device is described. The apparatus may include means for selecting settings for a set of multiple parameters associated with a first device based on an application running on the first device, where selecting the settings defines a device profile for the first device based on the application, performing a mapping procedure to map the device profile to at least one baseband configuration from a number of available baseband configurations, and communicating with a second device using the one or more baseband configurations based on performing the mapping procedure.

A non-transitory computer-readable medium storing code for wireless communication at a first device is described. The code may include instructions executable by a processor to select settings for a set of multiple parameters associated with a first device based at least in part on an application running on the first device, where selecting the settings defines a device profile for the first device based on the application, perform a mapping procedure to map the device profile to at least one baseband configuration from a number of available baseband configurations, and communicate with a second device using the one or more baseband configurations based on performing the mapping procedure.

In some examples of the method, apparatuses, and non-transitory computer-readable medium described herein, the mapping procedure may include combining a number of the available baseband configurations to provide a unique baseband configuration based on the device profile.

DETAILED DESCRIPTION

Figure 1:
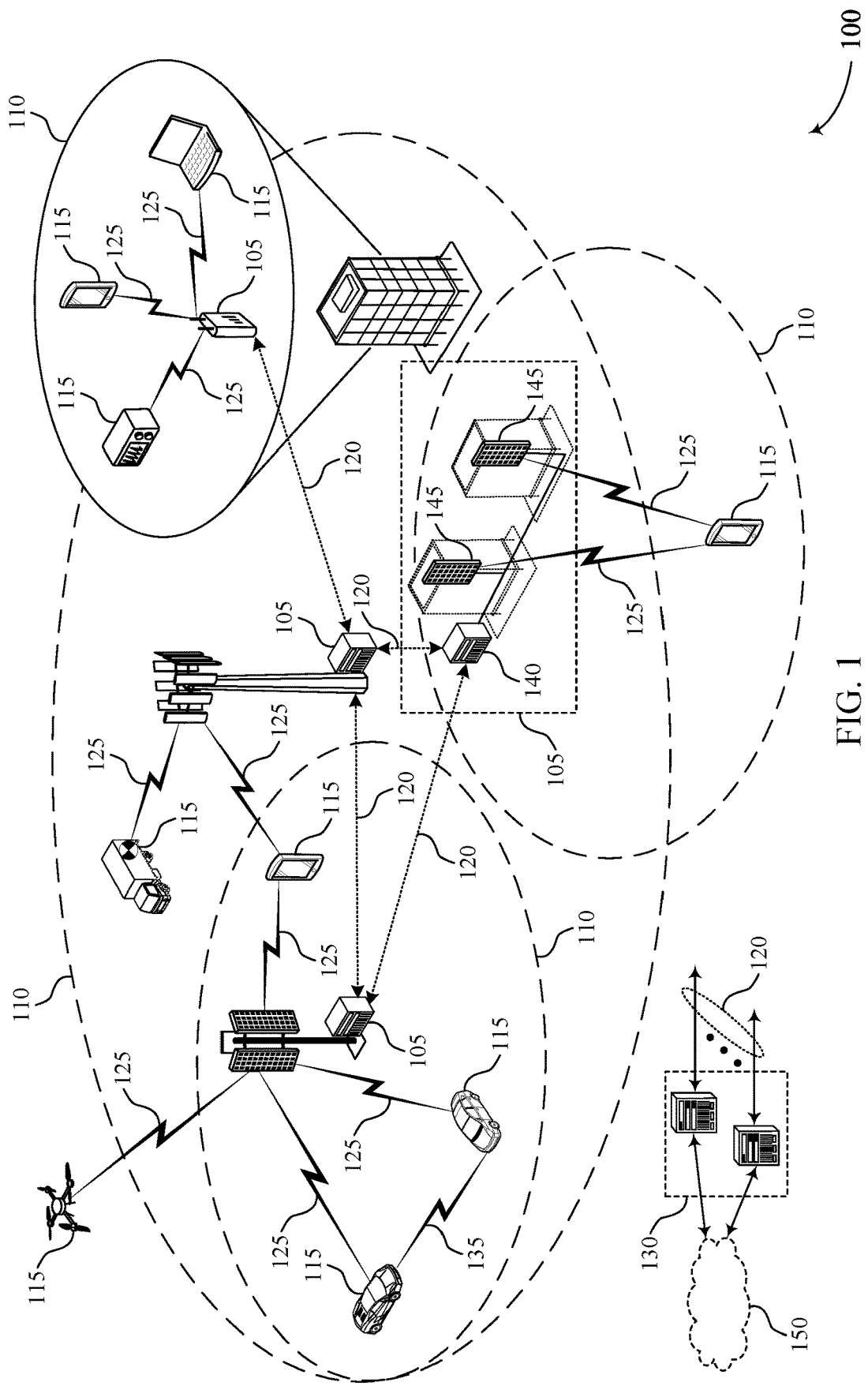
FIGS. 1 and 2 illustrate examples of wireless communications systems that support a modem framework for application-specific baseband customization at an end user in accordance with aspects of the present disclosure.

In some wireless communications systems, such as in wireless communications systems supporting internet of things (IoT) applications, a device (which may function as an IoT device) may operate according to a set functionality or configuration based on a type of application or deployment of the device. In other words, the device may be pre-configured with a set functionality or configuration based on a specific application of the device. Further, different applications may be associated with different power or performance constraints, and the device may be set with a fixed functionality or configuration that satisfies the power or performance constraints of the specific application of the device. As such, a single functionality or configuration that is set for a first application or group of applications may fail to satisfy power or performance constraints associated with a second application or group of applications. Accordingly, devices operating in different applications or groups of applications may be set with different functionalities or configurations. Because such variability in power or performance constraints between applications may result in different set operating configurations, a manufacturer may experience added costs as a number of device applications increases (as devices are configured with different functionalities on a per-application basis). Further, in some cases, the power or performance constraints of the device may change over time. In such cases, a fixed functionality or configuration of the device may fail to satisfy some power or performance constraints of the device, such as new or dynamic power or performance constraints of the device.

In some implementations of the present disclosure, a device may tune or customize the functionality or configuration of the device based on the specific application or constraints of the device. For example, the device may feature a selectable or customizable device profile that is based on a number of parameters associated with the application, deployment, or constraints of the device, and the device may employ a mapping between the selectable or customizable device profile and a functionality or configuration of the device. In some aspects, the functionality or configuration of the device may be based on one or more baseband configurations (e.g., baseband handles), which may refer to operational actions or configurations according to which the device may operate or communicate. For example, baseband may refer to a core functionality of a modem of the device and the device may use the one or more baseband configurations (e.g., the one or more baseband configurations that map to the selected or customized device profile) to tune (for example, configure or adjust) the baseband according to application constraints. As such, the device may achieve a functionality or configuration that satisfies a selectable or customizable device profile reflecting a current application, deployment, or constraints of the device.

In some aspects, the parameters on which the device profile is based may include a power parameter, a performance parameter, a coverage parameter, or a mobility parameter, one or more other parameters, or any combination thereof. Further, the mapping between the device profile and the one or more baseband configurations may include various mapping procedures. In some examples, for instance, the mapping procedure may include a referencing of a table including a correspondence between various device profiles and one or more baseband configurations. Additionally or alternatively, the mapping procedure may include a reinforcement learning procedure in which the mapping between various device profiles and one or more baseband configurations is learned (and can be adjusted for) over time based on feedback and application-specific communication metrics.

Particular aspects of the subject matter described in this disclosure can be implemented to realize one or more of the following potential advantages. For example, the described mapping procedure may be implemented to achieve a dynamic configuration of the device based on a selectable or customizable device profile. As such, the device may operate or communicate in accordance with (e.g., using) a configuration that reflects constraints associated with the application of the device as well as additional constraints resulting from other conditions, such as environmental factors. Further, based on implementing the described mapping procedure, a common configuration or software may be configured or loaded on various devices and a device may customize the configuration or software (during or after deployment) based on a specific application or condition of the device, which may reduce cost at a manufacturer while also providing flexible adaptation to various applications and deployment scenarios at an end user. For example, an original equipment manufacturer (OEM) or an original design manufacturer (ODM) may expose customization to the end application such that a customer or an end user may configure the baseband of the device based on the application of the device without directly selecting between different baseband configurations (as the mapping procedure may allow the device to select baseband configurations based on the application of the device).

As such, the common configuration or software may fit into multiple different applications and training (e.g., learning) may be performed offline or in simulators, which may reduce testing cost. Based on such flexible adaptability, the device may achieve an improved balance between performance and power savings with respect to the specific application and deployment scenario of the device. Further, in implementations in which the mapping procedure is refined via machine learning (e.g., reinforcement learning), the device may efficiently configure and tune the baseband of the device based on the application of the device in various operating environments. For example, the modem of the device may adapt to (or auto fix) any recurring issue in the field and continue to meet customer or application constraints regardless of the operating environment. Further, the described mapping procedure may be extended to include new modem profiles, handles, and features, which may allow for dynamic updating and extension of the device to new applications, new deployments, and new baseband functionality.

Aspects of the disclosure are initially described in the context of wireless communications systems. Additionally, aspects of the disclosure are illustrated by and described with reference to a modem framework, a reinforcement learning procedure, and a process flow. Aspects of the disclosure are further illustrated by and described with reference to apparatus diagrams, system diagrams, and flowcharts that relate to a modem framework for application-specific baseband customization at an end user.

FIG. 1 illustrates an example of a wireless communications system 100 that supports a modem framework for application-specific baseband customization at an end user in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or critical communications. The UEs 115 may be designed to support ultra-reliable, low-latency, or critical functions (e.g., critical communications). Ultra-reliable communications may include private communication or group communication and may be supported by one or more critical services such as critical push-to-talk, critical video, or critical data. Support for critical functions may include prioritization of services, and critical services may be used for public safety or general commercial applications. The terms ultra-reliable, low-latency, critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, such as frequency bands in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a device, such as a UE 115, may select a setting for at least some if not each of a set of parameters associated with a device profile of the device. The set of parameters may include, for example, a power parameter, a performance parameter, a coverage parameter (such as a maximum coupling loss (MCL) parameter), or a mobility parameter, or any combination thereof. In some aspects, such parameters may define the device profile and may be associated with an application, constraint, or condition of the device. For example, various settings of a parameter may be associated with different applications, constraints, or conditions of the device, among other examples.

The device, based on selecting the setting for at least some if not each of the set of parameters, may perform a mapping procedure to map the device profile (e.g., the selected settings of the set of parameters associated with the device profile) to one or more baseband configurations (e.g., baseband handles). Such baseband configurations or handles may refer to operational actions or configurations (of a baseband) according to which the device may operate or communicate. For example, baseband configurations may provide adjustments for to the first device in terms of timers or the enablement or disablement of one or more features of the device. Accordingly, in some implementations, the device may communicate with a second device, such as another UE 115, a base station 105, or an access point, using the one or more baseband configurations or handles identified via the mapping procedure.

In some examples, an application or condition of the device may change over time and the device may update a setting for at least one of the set of parameters associated with the device profile of the device. In other words, the device may (dynamically) select a new setting for at least one of the set of parameters. In such examples, the device may perform the mapping procedure (again) to map the new device profile (based on the newly selected settings) to a second one or more baseband configurations or handles. Accordingly, the device may operate or communication using the second one or more baseband configurations or handles.

Figure 2:
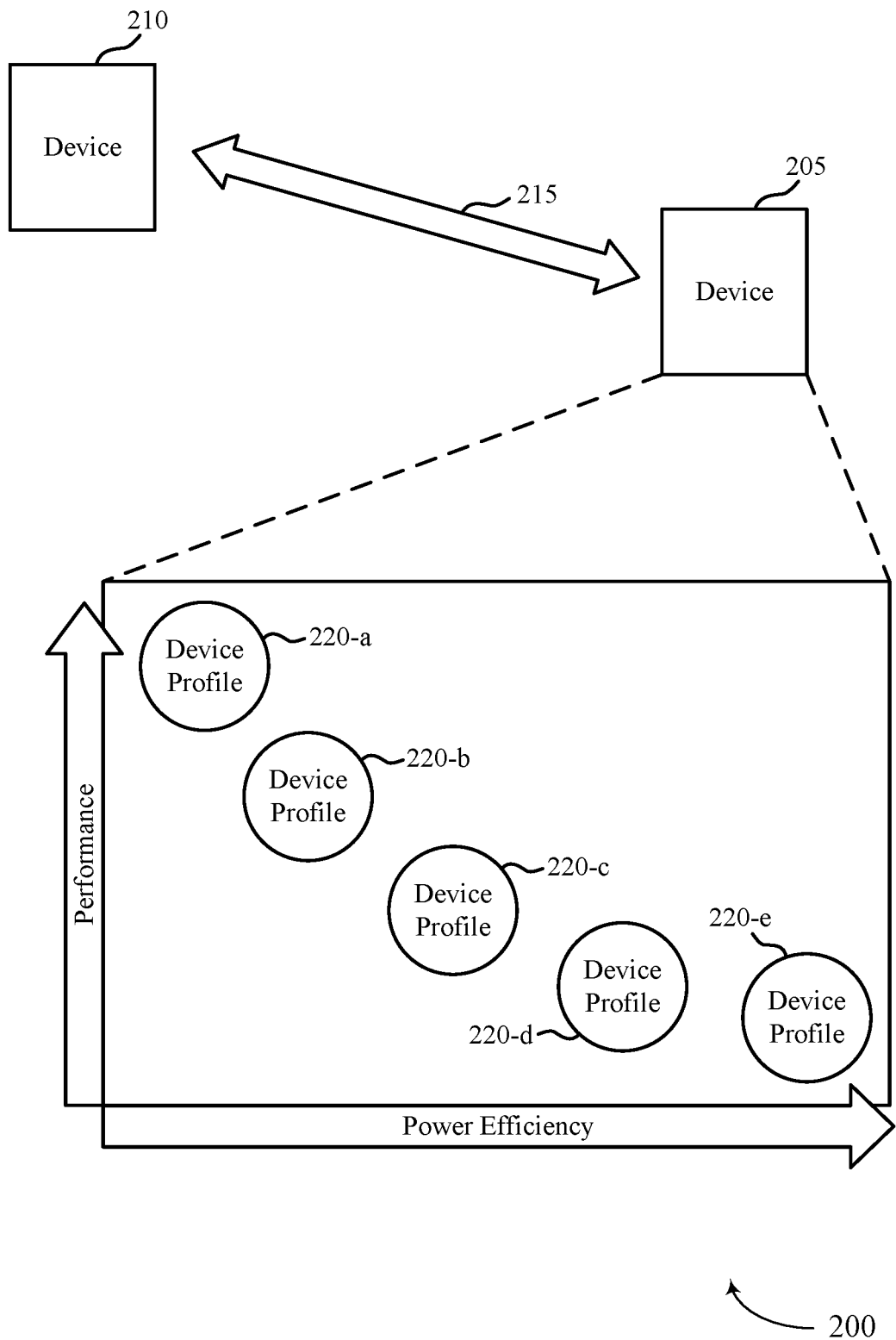

FIG. 2 illustrates an example of a wireless communications system 200 that supports a modem framework for application-specific baseband customization at an end user in accordance with aspects of the present disclosure. The wireless communications system 200 may implement or be implemented to realize aspects of the wireless communications system 100. For example, the wireless communications system 200 may include a device 205 and a device 210, which may be examples of devices (such as UEs 115, base stations 105, or access points) described herein, including with reference to FIG. 1. In some examples, the device 205 may select or otherwise determine to employ one or more baseband configurations (e.g., baseband handles) based on a mapping procedure between a device profile of the device 205 and various baseband configurations that the device 205 may use or apply during operation or communication. In some aspects, the device 205 may select the device profile based on an application of the device 205.

For example, the device 205 may be deployed for an application and may be configured with or otherwise feature a device profile based on that application. For instance, different applications may be associated with different conditions or constraints and the device 205 may be configured in accordance with the application of the device 205 to satisfy the (unique) conditions or constraints associated with that application. In some cases, different applications may be associated with different performance metrics or power efficiency metrics. For example, some applications may be associated with a relatively higher performance and a relatively lower power efficiency (such as applications associated with a deployment in which the device 205 is powered by mains) while other applications may be associated with a relatively lower performance and a relatively higher power efficiency (such as applications associated with a deployment in which the device 205 is powered by a battery or an otherwise limited power source).

If the device 205 is deployed as an energy meter (e.g., running an energy meter application), for example, the device 205 may be configured to meet a relatively higher performance metric and a relatively lower power efficiency metric because the energy meter is powered or sourced by mains. In such examples in which the device 205 functions as an energy meter (or another application associated with a deployment in which the device 205 is powered by mains), the device 205 may be configured with or otherwise feature a device profile 220-a (e.g., a device profile with a relatively higher performance and a relatively lower power efficiency).

Alternatively, if the device 205 is running an application associated with a deployment in which the device 205 is powered by a primary cell (e.g., a battery cell), the device 205 may be configured to meet a relatively lower performance metric and a relatively higher power efficiency metric. For example, if the device 205 is deployed as a water meter (e.g., running a water meter application), the device 205 may be configured to meet such a relatively lower performance metric and such a relatively higher power efficiency metric because the water meter may be powered or sourced by a primary cell (e.g., a battery cell). In such examples, the device 205 may be configured with or otherwise feature a device profile 220-d (e.g., a device profile with a relatively lower performance and a relatively higher power efficiency).

Similarly, if the device 205 is running an application associated with relatively higher mobility, such as a device or vehicle tracker (e.g., a bicycle tracker) application, the device 205 may be configured to meet a relatively higher performance metric and a relatively lower power efficiency metric because the application (e.g., the tracker) may be associated with relatively greater mobility support (as trackers are frequently in a high mobility state). In such examples in which the device 205 functions in a high mobility application (e.g., as a tracker), the device 205 may be configured with or otherwise feature a device profile 220-b (e.g., a device profile with a relatively higher performance and a relatively lower power efficiency).

Alternatively, if the device 205 is deployed in a relatively more stationary application, such as a gas meter (e.g., running a gas meter application), the device 205 may be configured to meet a relatively lower performance metric and a relatively higher power efficiency metric because of the stationary nature of the application (which may be associated with relatively lower mobility support). In such examples in which the device 205 functions in a stationary application (e.g., as a gas meter), the device 205 may be configured with or otherwise feature a device profile 220-e (e.g., a device profile with a relatively lower performance and a relatively higher power efficiency).

Alternatively, the device 205 may be configured with or otherwise feature a device profile 220-c, which may be an example of a device profile with a relatively moderate performance and a relatively moderate power efficiency. Such a device profile 220-c may be applicable or relevant for relatively generic solutions (in which neither performance or power efficiency are more or less constrained or impactful than the other).

Although illustrated in FIG. 2 as being based on performance and power efficiency, the device profile of the device 205 may additionally or alternatively be based on one or more other parameters associated with operation of the device 205. For example, a device profile may be based on a power parameter, a performance parameter, a coverage parameter, or a mobility parameter, or any combination thereof. Further, additional parameters not listed herein may be used or considered for defining a device profile without exceeding the scope of the present disclosure.

In some aspects, the device 205 may define the device profile of the device 205 based on selecting a setting for each parameter associated with the device profile (e.g., for each parameter that defines the device profile). For example, a power parameter of a device profile may include or feature multiple settings including a "constrained" setting, a "balanced" setting, and a "relaxed" setting. A performance parameter of a device profile may include or feature multiple settings including a "high" or "best" setting and an "optimized" or "application specific" setting. A coverage parameter of a device profile may be understood in a context of an MCL parameter or metric (which may be defined as a maximum or upper limit loss in power level that a system can experience while maintaining successful communication, such that the maximum or upper limit loss in power level avoids causing a received power to be below a minimum or lower limit received power level), which may include or feature multiple settings including 144 dB, 154 dB, and 164 dB. A mobility parameter of a device profile may include or feature multiple settings including a "fixed" setting, a "limited" setting, and a "wide" setting. Additional details relating to such parameter settings are described in more detail herein, including with reference to FIG. 3.

In an example, if the device 205 functions as an energy meter, the device 205 may be associated with a device profile that is defined based on a power parameter setting of "relaxed," a performance parameter setting of "best" or "high," a coverage parameter setting of 164 dB, and a mobility parameter setting of "fixed." Alternatively, in another example, if the device 205 functions as a gas meter, the device 205 may be associated with a device profile that is defined based on a power parameter setting of "constrained," a performance parameter setting of "optimized" or "application specific," a coverage parameter setting of 164 dB, and a mobility parameter setting of "fixed." Alternatively, in another example, if the device 205 functions as a tracker (e.g., a bicycle or other mobile equipment tracker), the device 205 may be associated with a device profile that is defined based on a power parameter setting of "balanced," a performance parameter setting of "optimized," a coverage parameter setting of 144 dB, and a mobility parameter setting of "wide."

In some cases, however, a baseband (e.g., a core baseband functionality or core functionality) of the device 205 may be unable to efficiently reflect the unique device profile of the device 205. For example, the device 205 may be configured with or otherwise feature a single baseband that is unable to reflect or adapt to the specific application of the device 205 (on which the device profile is based). In other words, even though some devices may perform actions (such as reducing a performance setting or an operational level of an active component) to satisfy one or more criteria (such as a power or thermal constraint), the actions and configurations of the modem of such devices may not be customizable based on the specific application of the devices (or the application running on the devices) and such devices may be unable to support customization or reconfiguration of the baseband during or after deployment (e.g., by an end user). For instance, such devices may be configured with a single baseband and device profiles of the devices may be external to or complement the single baseband such that the devices may be unable to adjust baseband functionality based on their respective device profiles. Such a single baseband may refer to a set functionality or configuration of a device (for example, fixed one or more timers or features that are either enabled or disabled) that the device is unable to change or alter.

In some implementations of the present disclosure, the device 205 may support a modem framework in which the baseband of the device 205 is tuned, customized, or otherwise configured for the application of the device 205 based on a mapping procedure between the device profile and one or more baseband configurations (or baseband handles). For example, the device 205, or a user of the device 205, may select a setting for at least some if not each of the parameters associated with (e.g., defining) the device profile of the device 205 and the device 205 may perform the mapping procedure to map the device profile (defined based on the selected settings for the various parameters associated with the device profile) to the one or more baseband configurations. In other words, based on implementing the techniques described herein, the device 205 may select one or more (or combine) baseband configurations to enable the baseband configurations to uniquely reflect the device profile of the device 205. The device 205 may accordingly operate or communicate (e.g., with the device 210 via a communication link 215) in accordance with or using the one or more baseband configurations. Additional details relating to such a mapping between the device profile of the device 205 and one or more baseband handles are illustrated and described herein, including by and with reference to FIG. 3.

Figure 3:
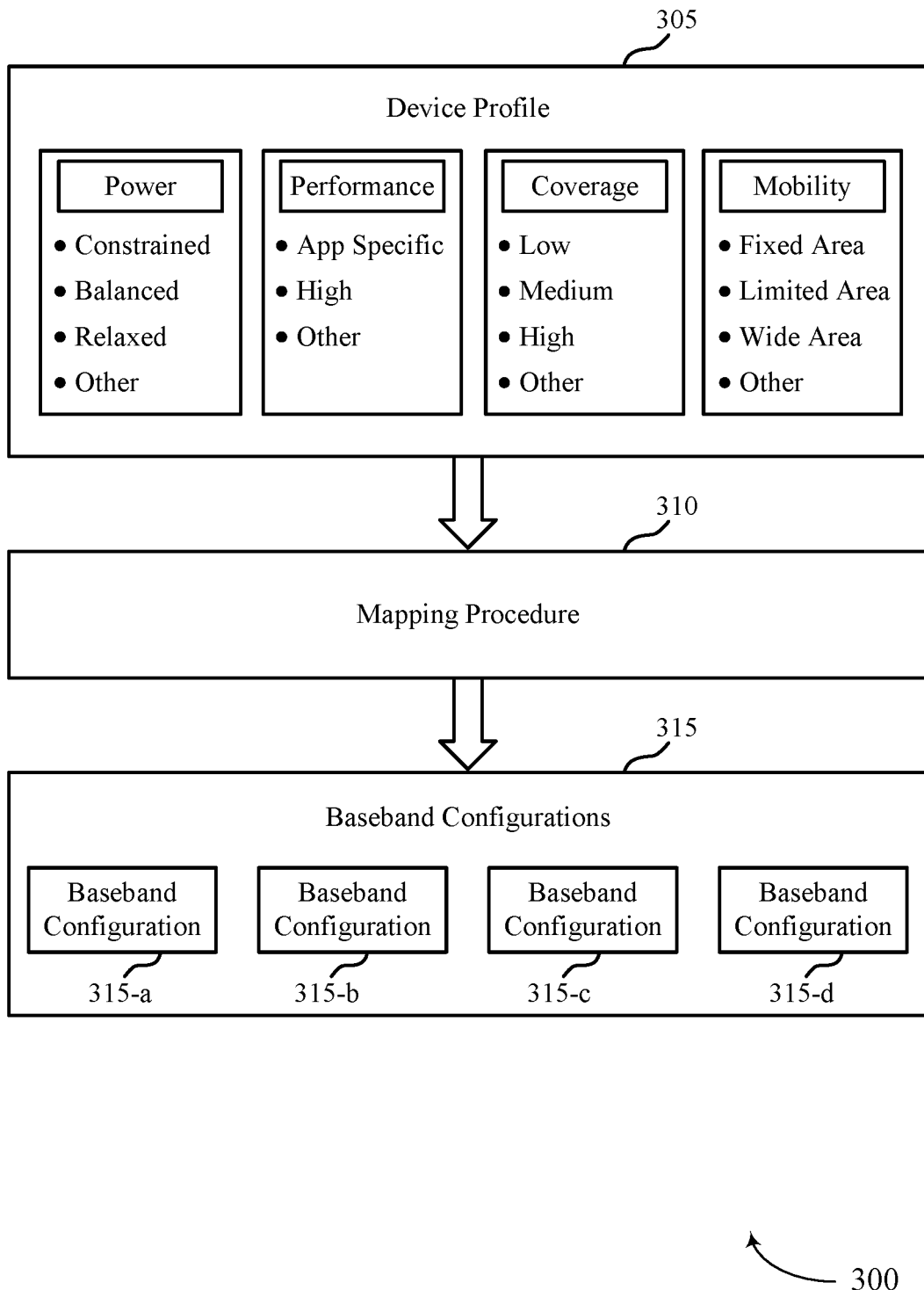
FIG. 3 illustrates an example of a modem framework that supports a modem framework for application-specific baseband customization at an end user in accordance with aspects of the present disclosure.

FIG. 3 illustrates an example of a modem framework 300 that supports a modem framework for application-specific baseband customization at an end user in accordance with aspects of the present disclosure. The modem framework 300 may implement or be implemented to realize aspects of the wireless communications system 100 or the wireless communications system 200. For example, a device, such as a UE 115 or a device 205 as described with reference to FIGS. 1 and 2, respectively, may implement the modem framework 300 to map a device profile 305 of the device to one or more baseband configurations 315 based on performing a mapping procedure 310.

As described in more detail herein, including with reference to FIG. 2, the device may select or otherwise set a setting for at least some if not each of a number of parameters associated with (e.g., defining) the device profile 305 of the device. As shown in FIG. 3, the device profile 305 may include or be based on (e.g., defined by) a power parameter, a performance parameter, a coverage parameter, and a mobility parameter. Although shown as including such parameters, however, the device profile 305 of the device may include or be based on any number of additional or alternative parameters without exceeding the scope of the present disclosure.

In some examples, the device may select a setting for at least some if not each of the multiple parameters based on an application of the device or a condition of the device. For example, some parameter settings may be more or less suited for an application than other parameter settings and the device may accordingly select parameter settings with respect to the application of the device. In some aspects, such settings for the various parameters may convey (or be based on) a condition or a constraint associated with that parameter with respect to the application of the device. For example, a setting for the power parameter may convey or be based on a power supply for the device, a setting for the performance parameter may convey or be based on a page miss rate metric or a measurement accuracy metric, a setting for the coverage parameter may convey or be based on an MCL metric, or a setting for the mobility parameter may convey or be based on a mobility state of the device, or any combination thereof.

For example, various settings of the power parameter may include a "constrained" setting for a relatively higher regulation or restriction in terms of power consumption, a "balanced" setting for a relatively moderate regulation or restriction in terms of power consumption, and a "relaxed" setting for a relatively lower regulation or restriction in terms of power consumption. As such, the device may select the "constrained" setting in examples in which the application or the deployment of the device results in the device deriving power from a non-rechargeable power source or employing a technique to maximize or reach an upper threshold years of use (YoU). The device may select such a "constrained" setting in examples in which the application of the device is associated with a finite or limited power supply, such as a battery cell. Alternatively, the device may select the "balanced" setting in examples in which the application or the deployment of the device results in the device deriving power from a rechargeable power source or employing technique to achieve a relatively moderate YoU. Alternatively, the device may select the "relaxed" setting in examples in which the application or the deployment of the device results in the device deriving power through mains or refraining from employing a constraint on YoU (e.g., such that YoU or longevity is a relatively less important consideration). Further, although described herein as including the "constrained" setting, the "balanced" setting, and the "relaxed" setting, the power parameter may additionally or alternatively include one or more other settings.

The various settings of the performance parameter may include an "application specific" setting (which may be equivalently referred to or understood as an "optimized" setting) in which the device may allow for some leniency in performance (e.g., some deviation from approximately peak accuracy) and a "high" setting (which may be equivalently referred to or understood as a "best" setting) in which the device targets approximately peak accuracy. As such, the device may select the "application specific" (or "optimized") setting in examples in which the application or deployment of the device is associated with or allows a relatively lenient target page miss rate (e.g., a target page miss rate of some quantity such as 10%) or a baseline measurement accuracy (as described in a specification, such as a technical specification defined by a standards body). In some aspects, the device may select such an "application specific" setting to provide the device with more flexibility to favor other metrics (other than performance metrics), such as power or thermal metrics, that may become more prominent or impactful in terms of a user experience or a longevity of the device. Alternatively, the device may select the "high" (or "best") setting in examples in which the application or deployment of the device is associated with a peak (or approximately a peak) accuracy. For example, the device may select such a "high" setting to satisfy a relatively strict target page miss rate (e.g., a target page miss rate of some quantity such as 1%) or a maximum measurement accuracy that the device is capable of obtaining. Further, although described herein as including the "application specific" setting and the "high" setting, the performance parameter may additionally or alternatively include one or more other settings.

Further, the various settings of the coverage parameter may include a "low" setting for a relatively low coverage constraint, a "medium" setting for a relatively moderate coverage constraint, and a "high" setting for a relatively high coverage constraint. As such, the device may select the "low" setting in examples in which the application or the deployment of the device is associated with a relatively low MCL metric, such as a 144 dB MCL metric (as may be common for a general packet radio service (GPRS)). Alternatively, the device may select the "medium" setting in examples in which the application or the deployment of the device is associated with a relatively moderate MCL metric, such as a 154 dB MCL metric. Alternatively, the device may select the "high" setting in examples in which the application or the deployment of the device is associated with a relatively high MCL metric, such as a 164 dB MCL metric. Further, although described herein as including a "low" setting, a "medium" setting, and a "high" setting, the coverage parameter may additionally or alternatively include one or more other settings. In some aspects, the device may select between the different coverage parameter settings based on a mobility or a location of the device (e.g., whether the device is outside or indoors, or may potentially be located behind potentially obstructing walls).

The various settings of the mobility parameter may include a "fixed area" setting for a relatively lower mobility constraint, a "limited area" setting for a relatively moderate mobility constraint, and a "wide area" setting for a relatively higher mobility constraint. As such, the device may select the "fixed area" setting in examples in which the application or deployment of the device is associated with a low mobility state. For example, the device may select the "fixed area" setting in examples in which the application or deployment of the device results in the device being stationary. Alternatively, the device may select the "limited area" setting in examples in which the application or deployment of the device is associated with a moderate mobility state. For example, the device may select the "limited area" setting in examples in which the application or deployment results in the device being mobile within a relatively small geographic area or moving slowly. Alternatively, the device may select the "wide area" setting in examples in which the application or deployment of the device is associated with a high mobility state. For example, the device may select the "wide area" setting in examples in which the application or deployment of the device results in the device being highly mobile or moving quickly. Further, although described herein as including the "fixed area" setting, the "limited area" setting, and the "wide area" setting, the mobility parameter may additionally or alternatively include one or more other settings.

The device, based on selecting a setting for at least some if not each of the parameters associated with or defining the device profile 305, may perform or otherwise utilize the mapping procedure 310 to map the settings for the parameters associated with the device profile 305 to one or more baseband configurations 315. In some aspects, the device may select settings for a subset of the parameters associated with the device profile 305 if some other of the parameters are fixed or if the device assumes a correlation or correspondence between various parameters (such that if the device selects a setting for a first parameter, the device may implicitly select a setting for a second setting based on the setting for the first parameter). In some other aspects, the device may implicitly select a setting for each of the parameters based on selecting a device profile 305. This may reduce processing complexity at the device.

The mapping procedure 310 may include or otherwise refer to any mapping or correlation between the device profile 305 and one or more baseband configurations 315. In some examples, for instance, performing the mapping procedure 310 may include a referencing of a table indicating a correspondence between device profiles 305 and baseband configurations 315. Additionally or alternatively, performing the mapping procedure 310 may include refining or adjusting the mapping between device profiles 305 and baseband configurations 315 based on a machine learning procedure (e.g., a reinforcement learning procedure). Additional details relating to such a reinforcement learning-based mapping procedure 310 are described herein, including with reference to FIG. 4.

In some aspects, the one or more baseband configurations 315 to which the device profile 305 of the device maps may include a number of pre-configured or available baseband configurations 315. For example, based on performing the mapping procedure 310, the device may select one or more (and possibly combine) baseband configurations 315 from the number of pre-configured or available baseband configurations 315. Additionally or alternatively, the device may modify or adjust one or more of the baseband configurations 315 (e.g., before use or during use) based on the application of the device. To achieve a baseband that is uniquely derived from the device profile 305 of the device, the device may select (and possibly combine) a set of baseband configurations 315 that is unique for the device profile 305 or may adjust values for one or more of the selected baseband configurations 315 such that the values of the one or more selected baseband configurations 315 are unique for the device profile 305, or both.

Table 1, shown below, illustrates how the various settings for each parameter may be represented as parameter indexes such that different device profiles 305 may be represented by different permutations of parameter indexes. For example, different device profiles 305 may be represented by different permutations of a set of parameter indexes including one index for each parameter. For instance, using the notation illustrated in Table 1, a device profile 305 may be represented by a {P, R, C, M} set.

TABLE 1

| Parameter | Setting | Parameter Index |
|---|---|---|
| Power (P) | Constrained | P1 |
| | Balanced | P2 |
| | Relaxed | P3 |
| Performance (R) | Application Specific | R1 |
| | High | R2 |
| Coverage (C) | Low (144 dB) | C1 |
| | Medium (154 dB) | C2 |
| | High (164 dB) | C3 |
| Mobility (M) | Fixed | M1 |
| | Limited | M2 |
| | Wide | M3 |

As such, in some implementations of the present disclosure, the device may perform the mapping procedure 310 by selecting or otherwise identifying a {P, R, C, M} set associated with the device profile 305 of the device and mapping the {P, R, C, M} set to one or more baseband configurations 315. For example, the device may select a {P1, R1, C3, M3} set (to represent a "constrained" power parameter setting, an "application specific" performance parameter setting, a "high" coverage parameter setting, and a "wide" mobility parameter setting) and may map the {P1, R1, C3, M3} set to a first one or baseband configurations 315 based on referencing a table indicating correspondences between various {P, R, C, M} sets and the baseband configurations 315. In some aspects, such a {P1, R1, C3, M3} set may be understood as a "power optimized solution."

Similarly, the device may select a {P3, R2, C3, M1} set (which may be understood as a "connected power meter") and may map the {P3, R2, C3, M1} set to a second one or more baseband configurations 315 based on referencing the table indicating the correspondences between various {P, R, C, M} sets and the baseband configurations 315. For further example, the device may select a {P2, R1, C1, M2} set (which may be understood as a "tracker") and may map the {P2, R1, C1, M2} set to a third one or more baseband configurations 315 based on referencing the table indicating the correspondences between various {P, R, C, M} sets and the baseband configurations 315. The device may similarly map any other permutation of a {P, R, C, M} set to one or more baseband configurations 315. In some aspects, such a table indicating the correspondences between various {P, R, C, M} sets and the baseband configurations 315 may include a number of columns with a row for each parameter (e.g., four rows) such that each column may include a different permutation of the {P, R, C, M} set and each column may correspond to one or more baseband configurations 315 that are suited or otherwise adapted for that permutation of the {P, R, C, M} set.

The device may, in some examples, refine or update a selected {P, R, C, M} set over time based on changing applications, deployments, or conditions. For example, the device may select a first {P, R, C, M} set when running or otherwise operating in a first application, map the first {P, R, C, M} set to a first one or more baseband configurations 315 (such as a baseband configuration 315-a and a baseband configuration 315-b), and customize the baseband of the device based on the first one or more baseband configurations 315. Accordingly, the device may operate or communicate in accordance with or using the first one or more baseband configurations 315 based on customizing the baseband of the device with the first one or more baseband configurations 315. In some implementations, the device may subsequently (e.g., at a later time) select a second {P, R, C, M} set when running or otherwise operating in a second application, map the second {P, R, C, M} set to a second one or more baseband configurations 315 (such as a baseband configuration 315-c and a baseband configuration 315-d), and customize (re-customize) the baseband of the device in accordance with or using the second one or more baseband configurations 315. Accordingly, the device may operate or communicate in accordance with or using the second one or more baseband configurations 315 based on customizing (re-customizing) the baseband of the device with the second one or more baseband configurations 315.

The first one or more baseband configurations 315 may at least partially overlapping (include one or more same baseband configurations 315, where such overlapping baseband configurations 315 may or may not be set with same values) or may be non-overlapping (include distinct sets of baseband configurations 315) with the second one or more baseband configurations 315. Further, in some aspects, the device may select the first one or more baseband configurations 315 and the second one or more baseband configurations from a set of pre-configured or available baseband configurations 315 and the device may adjust values for either or both sets of baseband configurations 315 based on the application of the device.

In some aspects, a user (e.g., an end user) may select the {P, R, C, M} set for the device via a user interface of the device based on the application of the device. For example, the interface may expose different device profiles 305 (or different settings for the parameters associated with a device profile 305) from which the user may select. In some other aspects, one or more algorithms or pre-configured procedures of the device may select the {P, R, C, M} set based on the application of the device (where such algorithms or procedures may detect the application of the device). For example, the device may use such algorithms or procedures to output a {P, R, C, M} set based on inputting the application of the device (or a value corresponding to the application of the device (such that an input into such algorithms or procedures includes the application of the device and the output is a {P, R, C, M} set). Further, the device or such algorithms or procedures of the device may detect the application of the device based on a deployment scenario or based on one or more measurements. For example, the device or such algorithms or procedures may detect the application of the device based on a detected mobility of the device or a detected power source for the device, among other examples. As such, the described techniques provide for an efficient mapping between various device profiles 305 (such as {P, R, C, M} sets) and baseband configurations 315 as well as a dynamic updating of a device profile 305 and a corresponding re-configuration or re-customization of the baseband of the device in response to the dynamic updating of the device profile 305.

The mapping procedure 310 may map the device profile 305 to any number of baseband configurations 315 and such baseband configurations 315 may include or refer to various actions, parameters, or configurations associated with operation or communication. In some aspects, the device may combine the number of baseband configurations 315 to achieve or select a unique configuration based on the device profile 305. For example, there may exist a number of possible combinations or permutations of baseband configurations 315 such that, by employing the mapping procedure 310 to identify or select the number of baseband configurations 315, the device may effectively select a unique combination of baseband configurations 315 in line with the device profile 305 of the device.

Such baseband configurations 315 (which may be equivalently referred to as baseband handles) may include or configure a sleep clock source, a clock plan, a scan depth, a measurement accuracy, one or more scan timers, a page only image, a modem sleep, a band scan time, a resynchronization time, Doppler support, a connected mode sleep, a paging maximum repetition (RMAX) limit, early termination, connected mode discontinuous reception (CDRX) support, a modem clock plan, a transmission control protocol (TCP) acknowledgement (ACK) delay timer, a T3324 timer, or a T3412 timer (for power saving mode (PSM)), or any combination thereof, among other examples. In some aspects, a page only image baseband configuration 315 may refer to a configuration or (processing) action that enables (loads or initializes) software code that supports idle page reception functionality. For example, such software code may exclusively support idle page reception functionality. Further, such baseband configurations 315 may operate independent of each other (e.g., perform separate tasks or configure separate parameters) or may be inter-dependent such that some baseband configurations 315 may be used in conjunction to perform a task or configure a parameter.

Accordingly, the device may use the various baseband configurations 315 to adjust or configure the baseband functionality of the device. In some aspects, for example, the device may use the band scan time handle to configure a maximum or upper limit number of frames a searcher will run for initial acquisition. The device may use the resynchronization timer handle to configure a maximum or upper limit number of frames for triple synchronization search for discontinuous reception (DRX) wakeup (e.g., the maximum number of frames used for synchronization may be different based on the MCL metric associated with the application or the device profile 305). The device may use the Doppler support handle to configure the Doppler estimation bins based on a mobility state of the device (e.g., the device may configure or cap (limit) the Doppler support based on the mobility associated with the application or the device profile 305). The device may use the connected mode sleep handle to enable or disable sleep at the device (which may provide power savings). The device may use the paging RMAX limit handle to configure a page reliability performance. The device may use the measurement accuracy handle to configure a number of frames used for accumulation of reference signals, which may be relaxed (e.g., reduced) in some scenarios or applications.

The device may use the early termination handle to enable or disable early termination (e.g., the device may use the early termination handle to disable early termination for relaxed power scenarios or applications). The device may use the sleep clock source handle to configure the sleep clock source (e.g., a "best" or peak sleep clock source can be used in relaxed power scenarios or applications). The device may use the CDRX support handle to enable or disable support for CDRX (e.g., the device may disable support for CDRX in relaxed power scenarios or applications). The device may use the modem clock plan handle to configure the clock plan or performance (e.g., the device may configure a relatively higher clock plan or performance in relaxed power scenarios or applications). The device may use the TCP ACK delay timer handle to configure the TCP ACK delay based on a latency constraint associated with the application. The device may use the T3324 timer handle or the T3412 handle, or both, to configure an idle and sleep mode duration in a PSM.

As such, the device may tune, adjust, or modify the different baseband configurations 315 for different applications or different device profiles 305. Such tuning, adjusting, or modifying of the baseband configurations 315 may include using different baseband configurations 315 to configure the baseband (such that actions, parameters, or configurations corresponding to the selected baseband configurations 315 are effectively tuned) or may include using a same one or more baseband configurations 315 to reconfigure an action, parameter, or configuration. In other words, different device profiles 305 may map to a same set of baseband configurations 315, but how the baseband configurations 315 are used to configure the baseband of the device may change with respect to the device profile 305 of the device. For example, the device may use different values for some baseband configurations 315 based on the application of the device. For instance, a value for the band scan time handle may be set differently based on a coverage associated with the application and a value for the Doppler support handle may be set differently based on a mobility associated with the application. As described herein, tuning the baseband configurations 315 may refer to adjusting a value of at least one baseband configuration 315 based on the device profile 305, combining baseband configurations 315 to provide a unique baseband configuration 315 based on the device profile 305, or both.

Further, although the mapping procedure 310 is described as including a referencing of a table indicating correspondences between different device profiles 305 and different baseband configurations 315, the mapping procedure 310 may include or refer to any mapping algorithm that indicates a correspondence between a device profile 305 and one or more baseband configurations 315. In some examples, for instance, the mapping procedure may include or be based on a reinforcement learning procedure or another machine learning procedure such that the mapping between device profiles 305 and baseband configurations 315 is adjusted based on the performance of the device over time. Additional details relating to such a reinforcement learning procedure to adjust the mapping procedure 310 are described herein, including with reference to FIG. 4.

Figure 4:
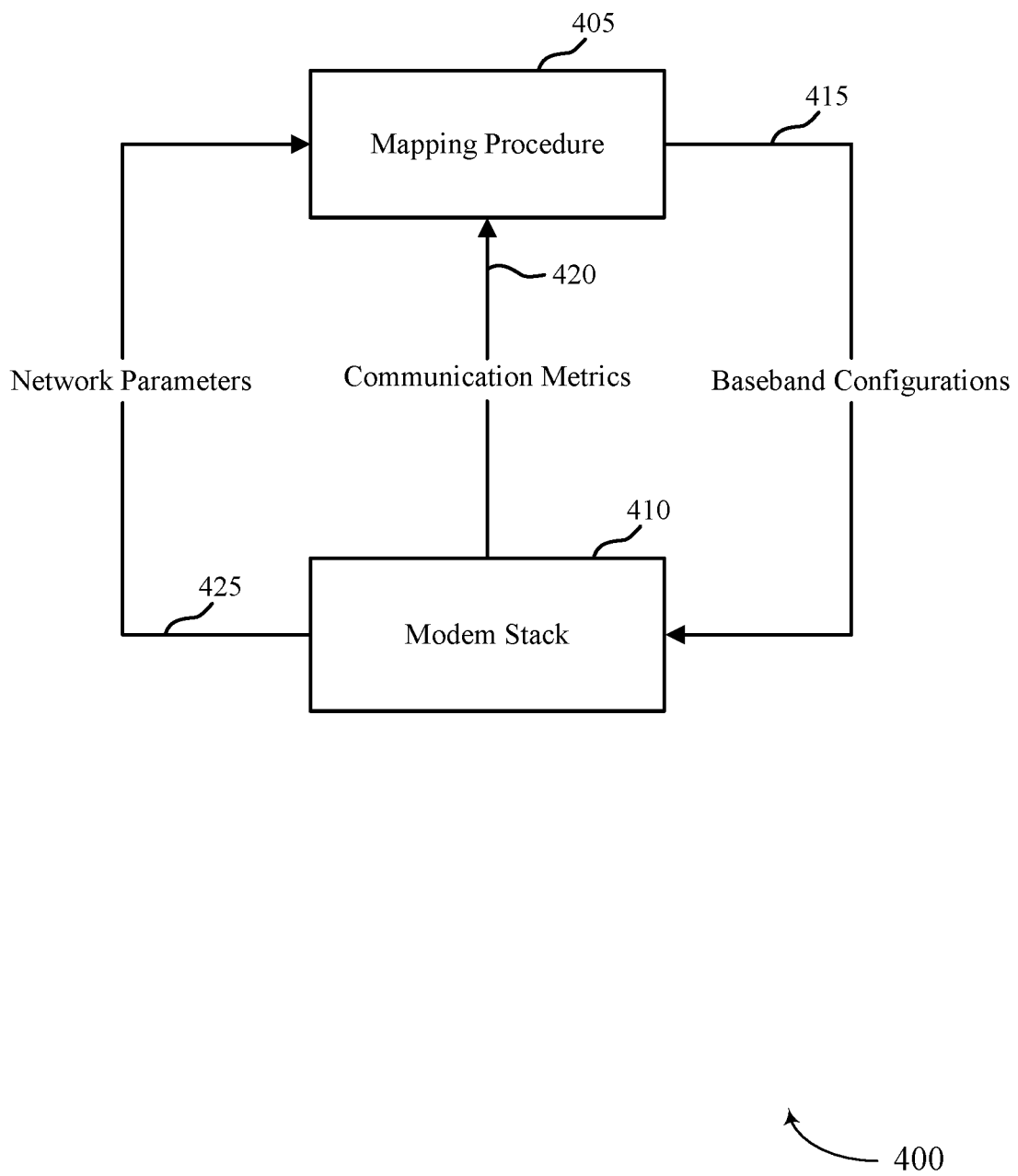
FIG. 4 illustrates an example of a reinforcement learning procedure that supports a modem framework for application-specific baseband customization at an end user in accordance with aspects of the present disclosure.

FIG. 4 illustrates an example of a reinforcement learning procedure 400 that supports a modem framework for application-specific baseband customization at an end user in accordance with aspects of the present disclosure. The reinforcement learning procedure 400 may implement or be implemented to realize aspects of the wireless communications system 100 or the wireless communications system 200. For example, a device (such as a UE 115 or a device 205 as described with reference to FIGS. 1 and 2, respectively) may perform the reinforcement learning procedure 400 to adjust a mapping procedure 405 that maps a device profile of the device to one or more baseband configurations based on the performance of the device and feedback from a modem stack 410 of the device, among other example aspects. In some examples, the reinforcement learning procedure 400 may be equivalently referred to or understood as, or implemented by, a machine learning algorithm.

As shown in the reinforcement learning procedure 400, the mapping procedure 405 may output (based on the mapping with the device profile of the device) one or more baseband configurations to the modem stack 410 of the device via a communication path 415. The modem stack 410 may reconfigure the baseband of the device based on the one or more baseband configurations received or output from the mapping procedure and the device may operate or communicate using the baseband that is reconfigured based on the one or more baseband configurations. The modem stack 410 may be equivalently referred to as a modem, which may perform one or more processing operations supporting wireless communication at the device. For example, a modem may convert data from a digital format into a format that is more suitable for over-the-air transmission.

The modem stack 410, based on the operating or communicating, may detect or otherwise obtain one or more communication metrics associated with the baseband of the device and, in some implementations, with respect to the application of the device. For example, the modem stack 410 may obtain one or more communication metrics that are relevant for the application of the device (such as a power metric in examples in which the application of the device results in the device being sourced by a battery cell or a performance metric in examples in which the application of the device is associated with a relatively high performance parameter setting). In some aspects, a power metric may include a YoU metric and a performance metric may include a block error rate (BLER). Based on obtaining the one or more communication metrics, the modem stack 410 may provide the one or more communication metrics to the mapping procedure 405 via a communication path 420. In some cases, such communication metrics that are provided to the mapping procedure 405 from the modem stack 410 within the reinforcement learning procedure 400 may be equivalently referred to or understood as a reward signal indicating "rewards" resulting from the customization of the baseband based on the baseband configurations output from the mapping procedure 405.

Additionally or alternatively, the modem stack 410 may obtain one or more network parameters (e.g., a modem state or an observed state) and may provide the mapping procedure 405 with the one or more network parameters via a communication path 425. In some aspects, such one or more network parameters may include system information (e.g., system information received from an access point or a base station) or one or more measured parameters. Such measured parameters may include a signal-to-noise ratio (SNR), a rogue Ncell, a reference signal received power (RSRP), or an interference level, among other examples.

The device, based on obtaining the one or more communication metrics and the one or more network parameters, may adjust the mapping procedure 405 used to map the device profile (or to map the settings for the parameters associated with the device profile) to one or more baseband configurations based on the one or more communication metrics and the one or more network parameters. For example, the device may adjust the mapping procedure 405 such that a same device profile (e.g., a same permutation of settings for the parameters associated with or defining the device profile) maps to a different one or more baseband configurations. As such, multiple devices (e.g., two or more devices) or a same device at different points in time using a same device profile but operating in different environmental conditions (e.g., receiving different network parameters from the modem stack 410) or receiving different communication metrics may configure different baseband functionalities based on the different environmental conditions or different communication metrics. The device may perform the mapping procedure 405 to map the device profile to one or more baseband configurations using the adjusted mapping. As such, the mapping procedure 405 may function or otherwise act as an agent (e.g., receiving inputs and refining actions based on the inputs) and may control the modem stack 410 (which may be understood as an environment) through baseband configurations to maximize the "rewards" provided from the modem stack 410.

Further, the communication path 415, the communication path 420, and the communication path 425 may be examples of any hardware that facilitates electronic communication between different physical components, may be logical or "virtual" paths to show a transfer of information between the mapping procedure 405 and the modem stack 410, or may be used for illustrative purposes to show the feedback loop of the reinforcement learning procedure 400.

Figure 5:
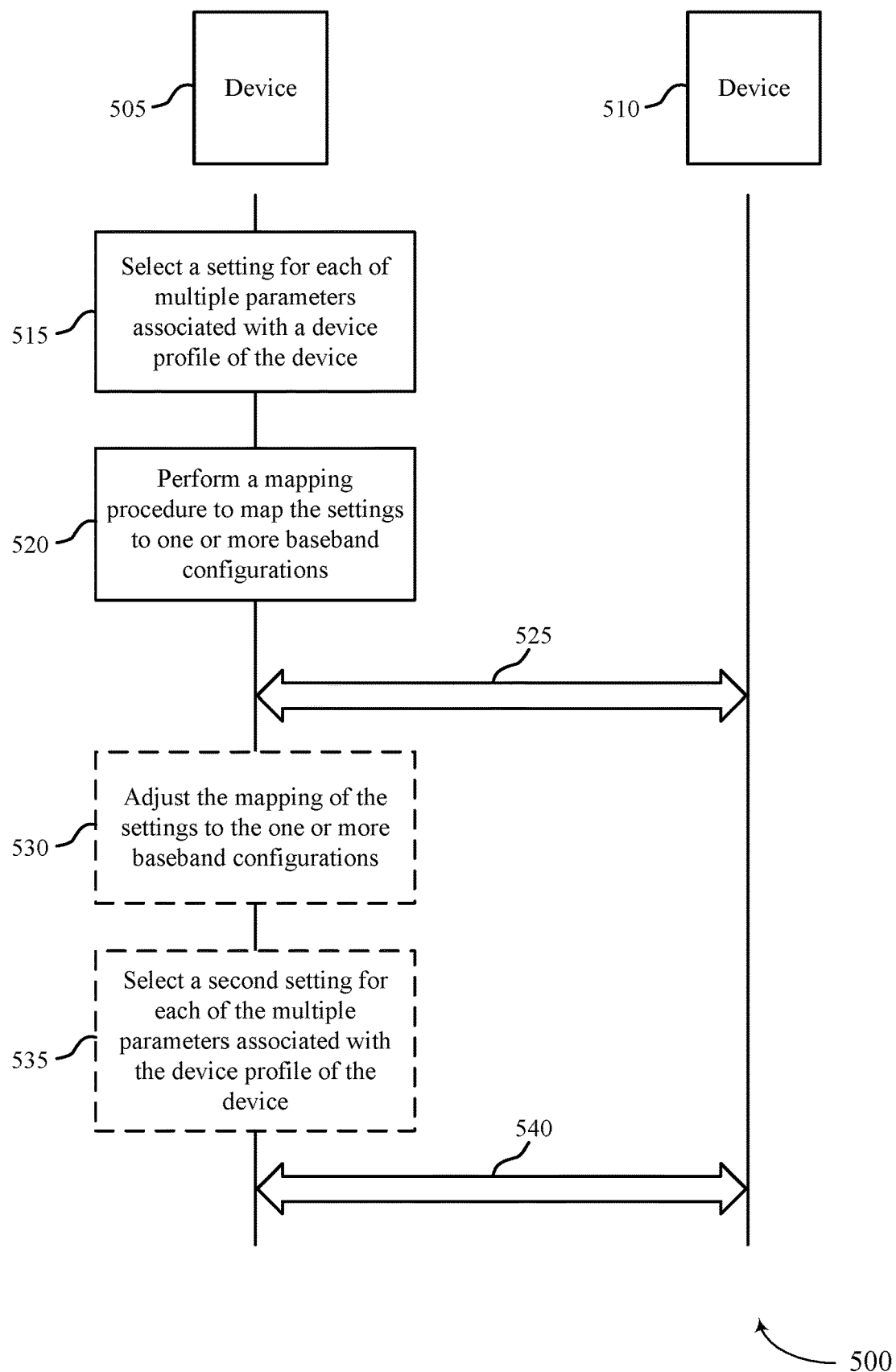
FIG. 5 illustrates an example of a process flow that supports a modem framework for application-specific baseband customization at an end user in accordance with aspects of the present disclosure.

FIG. 5 illustrates an example of a process flow 500 that supports a modem framework for application-specific baseband customization at an end user in accordance with aspects of the present disclosure. The process flow 500 may implement or be implemented to realize aspects of the wireless communications system 100 or the wireless communications system 200. For example, the process flow 500 may illustrate communication between a device 505 and a device 510, which may be examples of corresponding devices described herein, including with reference to FIGS. 1 and 2. In some examples, the device 505 may perform a mapping procedure to map settings for each parameter associated with a device profile to one or more baseband configurations or handles to configure the baseband of the device 505 based on a specific application of the device 505.

In the following description of the process flow 500, the operations may be performed (e.g., reported or provided) in a different order than the order shown, or the operations performed by the device 505 and the device 510 may be performed in different orders or at different times. For example, specific operations may also be left out of the process flow 500, or other operations may be added to the process flow 500. Further, although some operations or signaling may be shown to occur at different times for discussion purposes, these operations may actually occur at the same time.

At 515, the device 505 may select a setting for at least some if not each of a set of multiple parameters associated with a device profile of the device 505 based on an application running on the device 505 (or an application or deployment of the device 505). For example, the device 505 may select a setting for at least some if not each of a power parameter, a performance parameter, a coverage parameter, or a mobility parameter, or any combination thereof, to define the device profile of the device 505. In some aspects, the device 505 may receive a selection of the settings for the parameters associated with the device profile of the device 505 from a user (e.g., an end user) via a user interface. In some examples, the device 505 may change its device profile or the settings of the parameters associated with its device profile (based on a new application of the device 505, a new deployment of the device 505, or changing network or environmental conditions). Additional details relating to such a selection of settings for parameters associated with a device profile are described herein, including with reference to FIG. 3.

At 520, the device 505 may perform a mapping procedure to map the settings for the set of multiple parameters associated with the device profile to one or more baseband configurations or baseband handles. In some examples, the mapping procedure may include a referencing of a table indicating a correspondence between the settings for the parameters associated with the device profile and the one or more baseband configurations. In some other examples, the mapping procedure may include a reinforcement learning procedure in which the mapping between the settings for the parameters associated with the device profile and the one or more baseband configurations is learned or adjusted over time based on feedback and environmental conditions. Additional details relating to such a mapping procedure are described herein, including with reference to FIGS. 3 and 4.

At 525, the device 505 may communicate with the device 510 using the one or more baseband configurations. For example, the device 505 may configure, tune, or customize the baseband of the device 505 using the one or more baseband configurations that map to the settings for the parameters associated with the device profile of the device 505 and the device may accordingly operate or communicate in accordance with the configured, tuned, or customized baseband.

At 530, the device 505 may, in some implementations, adjust the mapping of the settings for the parameters associated with the device profile to the one or more baseband configurations based on performing a reinforcement learning procedure. For example, the device 505 may obtain, via a modem stack of the device 505, one or more communication metrics or one or more network parameters, or both, and the device 505 may adjust the mapping of the settings for the parameters associated with the device profile to the one or more baseband configurations based on the one or more communication metrics or the one or more network parameters, or both. Additional details relating to such a reinforcement leaning procedure are described herein, including with reference to FIG. 4.

At 535, the device 505 may, in some implementations, select a second setting for at least some if not each of the parameters associated with the device profile of the device 505 based on a second application running on the device 505 (e.g., a second application or deployment of the device 505). Accordingly, the device 505 may perform a second mapping procedure to map the second settings for the parameters associated with the device profile to a second one or more baseband configurations or handles. In some examples, the second mapping procedure may include a referencing of the table indicating the correspondence between the settings for the parameters associated with the device profile and the baseband configurations. In some other examples, the second mapping procedure may include a reinforcement learning procedure in which the mapping between the second settings for the parameters associated with the device profile and the second one or more baseband configurations is learned or adjusted over time based on feedback and environmental conditions. Additional details relating to such a mapping procedure are described herein, including with reference to FIGS. 3 and 4.

At 540, the device 505 may communicate with the device 510 using either the adjusted baseband configurations (as obtained from the reinforcement learning procedure at 530) or the second one or more baseband configurations (as obtained as a result of selecting the second settings for the parameters associated with the device profile at 535), or both. For example, the device 505 may configure, tune, or customize the baseband of the device 505 using the adjusted one or more baseband configurations or the second one or more baseband configurations and the device may accordingly operate or communicate in accordance with the configured, tuned, or customized baseband.

Figure 6:
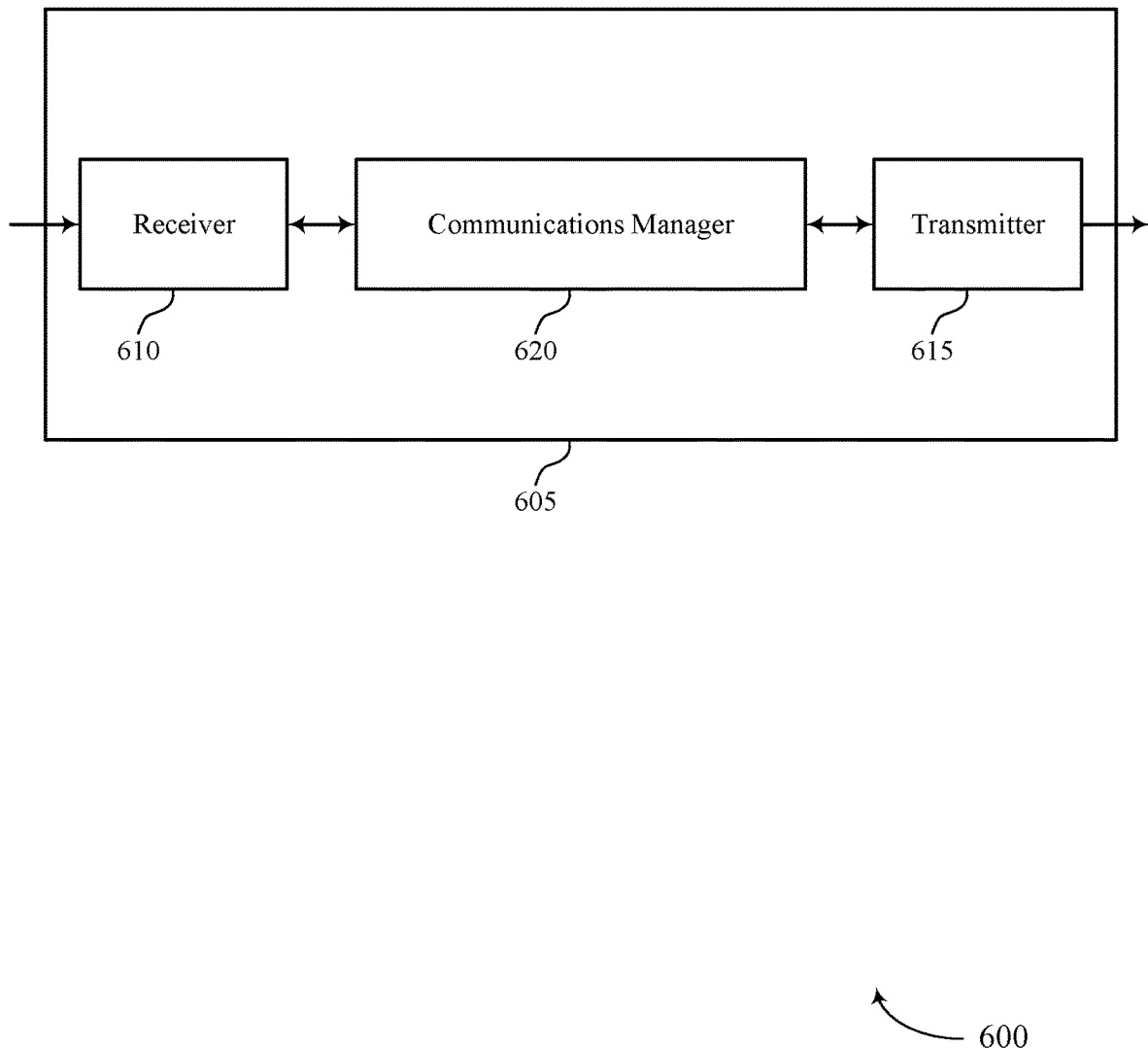
FIGS. 6 and 7 show block diagrams of devices that support a modem framework for application-specific baseband customization at an end user in accordance with aspects of the present disclosure.

FIG. 6 shows a block diagram 600 of a device 605 that supports a modem framework for application-specific baseband customization at an end user in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to a modem framework for application-specific baseband customization at an end user). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to a modem framework for application-specific baseband customization at an end user). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of a modem framework for application-specific baseband customization at an end user as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device in accordance with examples as disclosed herein. For example, the communications manager 620 may be configured as or otherwise support a means for selecting a setting for each of a set of multiple parameters associated with a device profile of the first device based on an application running on the first device. Additionally or alternatively, the communications manager 620 may be configured as or otherwise support a means for selecting settings for a set of multiple parameters associated with a device profile of the first device based on an application of the first device. The communications manager 620 may be configured as or otherwise support a means for performing a mapping procedure to map the settings for the set of multiple parameters associated with the device profile to one or more baseband configurations based on selecting the setting for each of the set of multiple parameters associated with the device profile. Additionally or alternatively, the communications manager 620 may be configured as or otherwise support a means for performing a mapping procedure to map the settings for the set of multiple parameters associated with the device profile to one or more baseband configurations based on selecting the settings for the set of multiple parameters associated with the device profile. The communications manager 620 may be configured as or otherwise support a means for communicating with a second device using the one or more baseband configurations based on performing the mapping procedure.

Additionally or alternatively, the communications manager 620 may be configured as or otherwise support a means for selecting settings for a set of multiple parameters associated with a first device based on an application running on the first device, where selecting the settings defines a device profile for the first device based on the application. The communications manager 620 may be configured as or otherwise support a means for performing a mapping procedure to map the device profile to at least one baseband configuration from a number of available baseband configurations. The communications manager 620 may be configured as or otherwise support a means for communicating with a second device using the one or more baseband configurations based on performing the mapping procedure.

By including or configuring the communications manager 620 in accordance with examples as described herein, the device 605 (e.g., a processor controlling or otherwise coupled to the receiver 610, the transmitter 615, the communications manager 620, or any combination thereof) may support techniques for more efficient processing and more efficient power consumption (e.g., based on an application). Further, the device 605 may support techniques for dynamic customization of a baseband of the device 605 at an end user based on an application of the device 605, which may reduce manufacturing costs at an OEM or an ODM.

Figure 7:
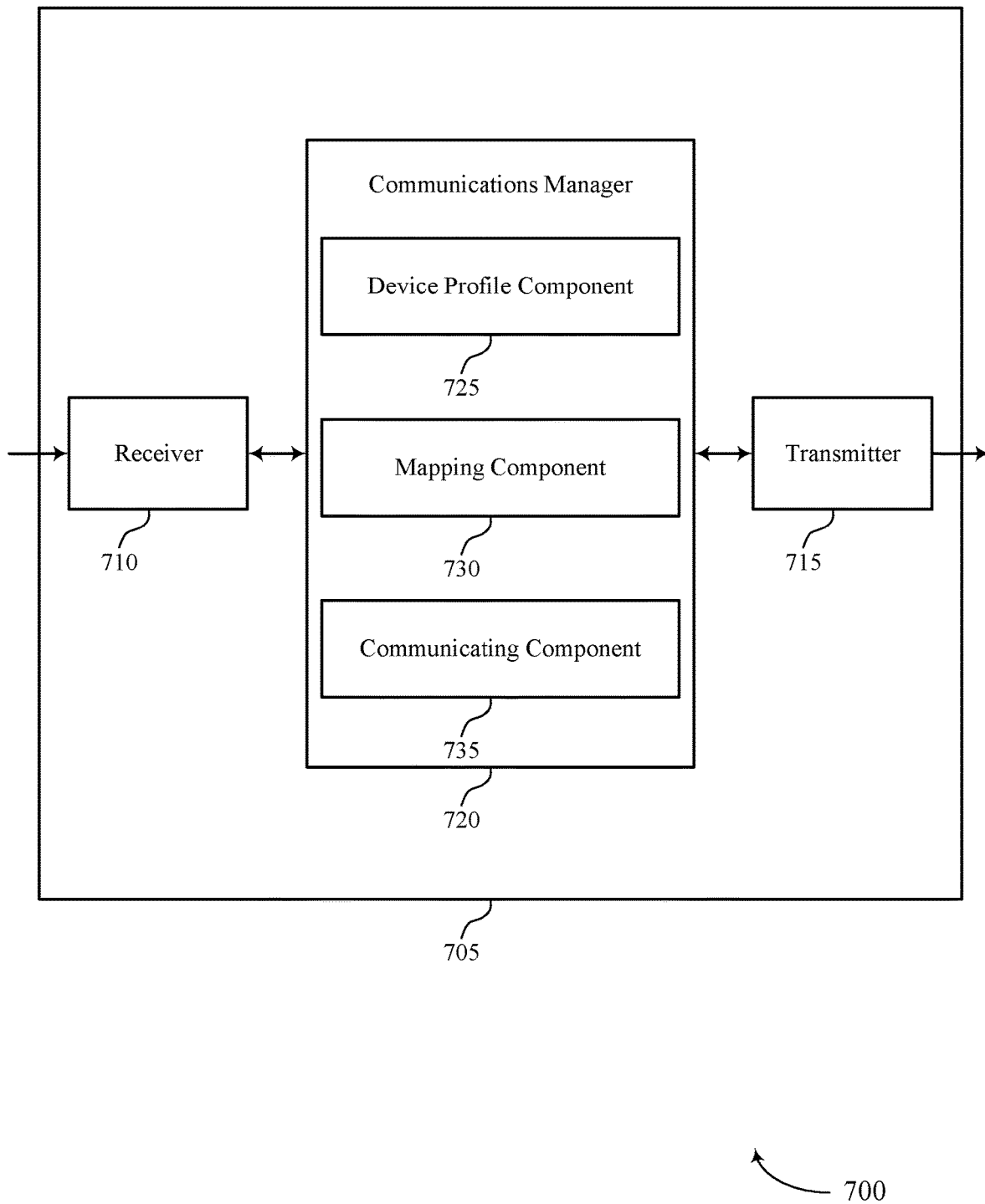

FIG. 7 shows a block diagram 700 of a device 705 that supports a modem framework for application-specific baseband customization at an end user in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to a modem framework for application-specific baseband customization at an end user). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to a modem framework for application-specific baseband customization at an end user). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of a modem framework for application-specific baseband customization at an end user as described herein. For example, the communications manager 720 may include a device profile component 725, a mapping component 730, a communicating component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device in accordance with examples as disclosed herein. The device profile component 725 may be configured as or otherwise support a means for selecting a setting for each of a set of multiple parameters associated with a device profile of the first device based on an application running on the first device. Additionally or alternatively, the device profile component 725 may be configured as or otherwise support a means for selecting settings for a set of multiple parameters associated with a device profile of the first device based on an application of the first device. The mapping component 730 may be configured as or otherwise support a means for performing a mapping procedure to map the settings for the set of multiple parameters associated with the device profile to one or more baseband configurations based on selecting the setting for each of the set of multiple parameters associated with the device profile. Additionally or alternatively, the mapping component 730 may be configured as or otherwise support a means for performing a mapping procedure to map the settings for the set of multiple parameters associated with the device profile to one or more baseband configurations based on selecting the settings for the set of multiple parameters associated with the device profile. The communicating component 735 may be configured as or otherwise support a means for communicating with a second device using the one or more baseband configurations based on performing the mapping procedure.

Additionally or alternatively, the device profile component 725 may be configured as or otherwise support a means for selecting settings for a set of multiple parameters associated with a first device based on an application running on the first device, where selecting the settings defines a device profile for the first device based on the application. The mapping component 730 may be configured as or otherwise support a means for performing a mapping procedure to map the device profile to at least one baseband configuration from a number of available baseband configurations. The communicating component 735 may be configured as or otherwise support a means for communicating with a second device using the one or more baseband configurations based on performing the mapping procedure.

Figure 8:
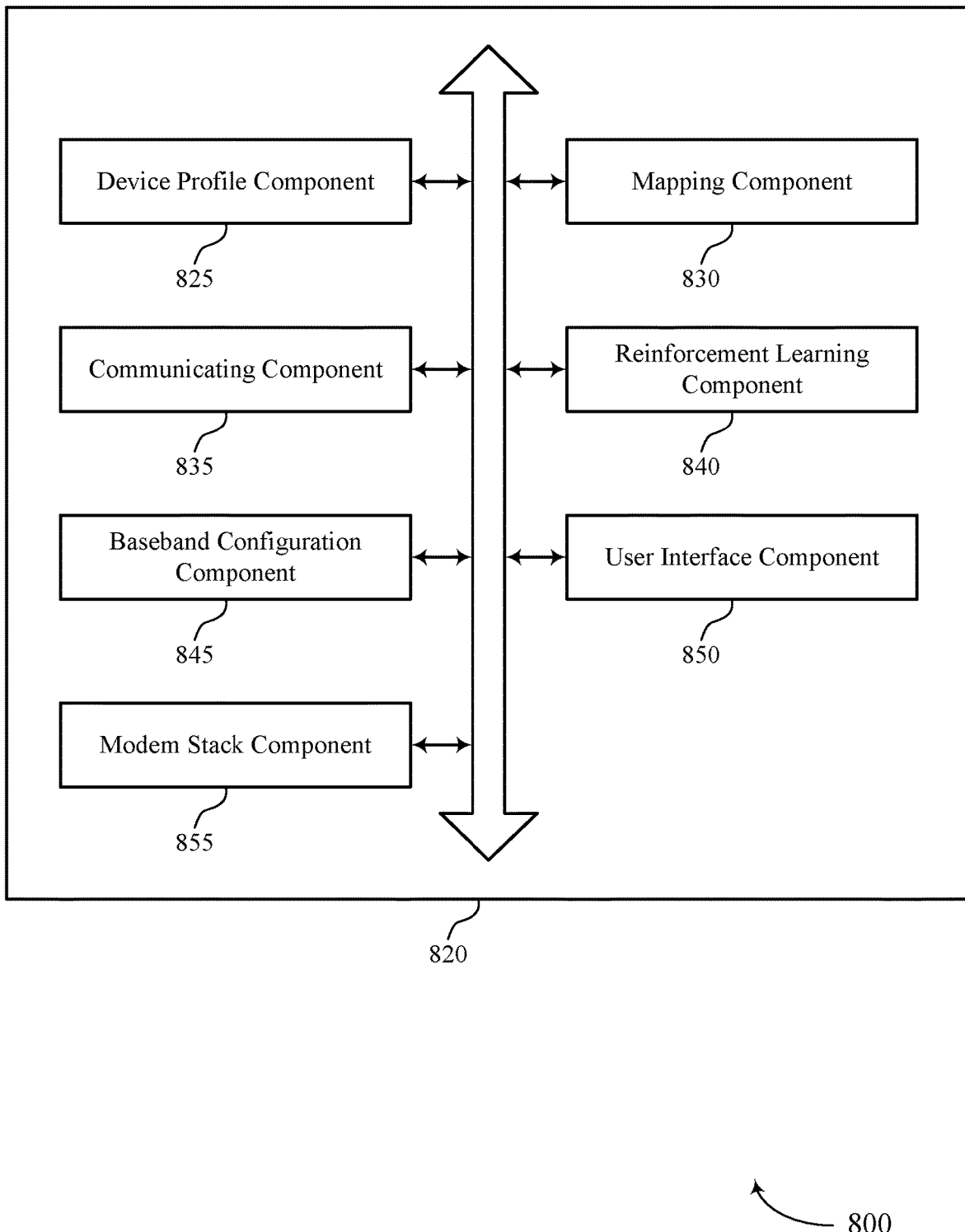
FIG. 8 shows a block diagram of a communications manager that supports a modem framework for application-specific baseband customization at an end user in accordance with aspects of the present disclosure.

FIG. 8 shows a block diagram 800 of a communications manager 820 that supports a modem framework for application-specific baseband customization at an end user in accordance with aspects of the present disclosure. The communications manager 820 may be an example of aspects of a communications manager 620, a communications manager 720, or both, as described herein. The communications manager 820, or various components thereof, may be an example of means for performing various aspects of a modem framework for application-specific baseband customization at an end user as described herein. For example, the communications manager 820 may include a device profile component 825, a mapping component 830, a communicating component 835, a reinforcement learning component 840, a baseband configuration component 845, a user interface component 850, a modem stack component 855, or any combination thereof. Each of these components may communicate, directly or indirectly, with one another (e.g., via one or more buses).

The communications manager 820 may support wireless communication at a first device in accordance with examples as disclosed herein. The device profile component 825 may be configured as or otherwise support a means for selecting a setting for each of a set of multiple parameters associated with a device profile of the first device based on an application running on the first device. Additionally or alternatively, the device profile component 825 may be configured as or otherwise support a means for selecting settings for a set of multiple parameters associated with a device profile of the first device based on an application of the first device. The mapping component 830 may be configured as or otherwise support a means for performing a mapping procedure to map the settings for the set of multiple parameters associated with the device profile to one or more baseband configurations based on selecting the setting for each of the set of multiple parameters associated with the device profile. Additionally or alternatively, the mapping component 830 may be configured as or otherwise support a means for performing a mapping procedure to map the settings for the set of multiple parameters associated with the device profile to one or more baseband configurations based on selecting the settings for the set of multiple parameters associated with the device profile. The communicating component 835 may be configured as or otherwise support a means for communicating with a second device using the one or more baseband configurations based on performing the mapping procedure.

In some examples, to support performing the mapping procedure, the mapping component 830 may be configured as or otherwise support a means for referencing a table indicating a correspondence between the settings for the set of multiple parameters associated with the device profile and the one or more baseband configurations. In some examples, the table indicates a correspondence between each permutation of settings for the set of multiple parameters associated with the device profile and a unique one or more baseband configurations.

In some examples, to support performing the mapping procedure, the reinforcement learning component 840 may be configured as or otherwise support a means for performing a reinforcement learning procedure to adjust a mapping of the settings for the set of multiple parameters associated with the device profile to the one or more baseband configurations.

In some examples, the modem stack component 855 may be configured as or otherwise support a means for receiving, from a modem of the first device, one or more communication metrics associated with the communicating with the second device using the one or more baseband configurations, where the one or more communication metrics are based on the application running on the first device. In some examples, to perform the mapping procedure, the reinforcement learning component 840 may be configured as or otherwise support a means for performing the reinforcement learning procedure to adjust the mapping of the settings for the set of multiple parameters associated with the device profile to the one or more baseband configurations based on the one or more communication metrics.

In some examples, the modem stack component 855 may be configured as or otherwise support a means for receiving, from a modem of the first device, one or more network parameters associated with the communicating with the second device using the one or more baseband configurations. In some examples, to perform the mapping procedure, the reinforcement learning component 840 may be configured as or otherwise support a means for performing the reinforcement learning procedure to adjust the mapping of the settings for the set of multiple parameters associated with the device profile to the one or more baseband configurations based on the one or more network parameters.

In some examples, the device profile component 825 may be configured as or otherwise support a means for updating a setting for at least one of the set of multiple parameters associated with the device profile of the first device based on a second application of the first device. In some examples, the mapping component 830 may be configured as or otherwise support a means for performing a second mapping procedure to map the updated settings for the set of multiple parameters associated with the device profile to a second one or more baseband configurations based on updating the setting for the at least one of the set of multiple parameters associated with the device profile. In some examples, the communicating component 835 may be configured as or otherwise support a means for communicating with the second device using the second one or more baseband configurations based on performing the second mapping procedure.

In some examples, the baseband configuration component 845 may be configured as or otherwise support a means for adjusting a value for at least one of the one or more baseband configurations based on the application running on the first device, where communicating with the second device is based on adjusting the value for the at least one of the one or more baseband configurations.

In some examples, the user interface component 850 may be configured as or otherwise support a means for receiving, via a user interface of the first device, an indication of the settings for the set of multiple parameters associated with the device profile, where selecting the settings for the set of multiple parameters associated with the device profile is based on receiving the indication.

In some examples, the settings for the set of multiple parameters are selected based on an application program running on the first device.

In some examples, the set of multiple parameters associated with the device profile include a power parameter, a performance parameter, a coverage parameter, or a mobility parameter, or any combination thereof. In some examples, the one or more baseband configurations include a beam scan time, a resynchronization time, a Doppler support adjustment, an enablement or disablement of a sleep mode, a page reliability performance metric, a measurement accuracy metric, an enablement or disablement of early termination, a sleep clock source, an enablement or disablement of connected mode discontinuous reception, a modem clock plan, a transmission control protocol acknowledgement delay timer adjustment, or an idle and sleep duration timer, or any combination thereof.

In some examples, the mapping component 830 may be configured as or otherwise support a means for combining a number of the available baseband configurations to provide a unique baseband configuration based on the device profile.

Figure 9:
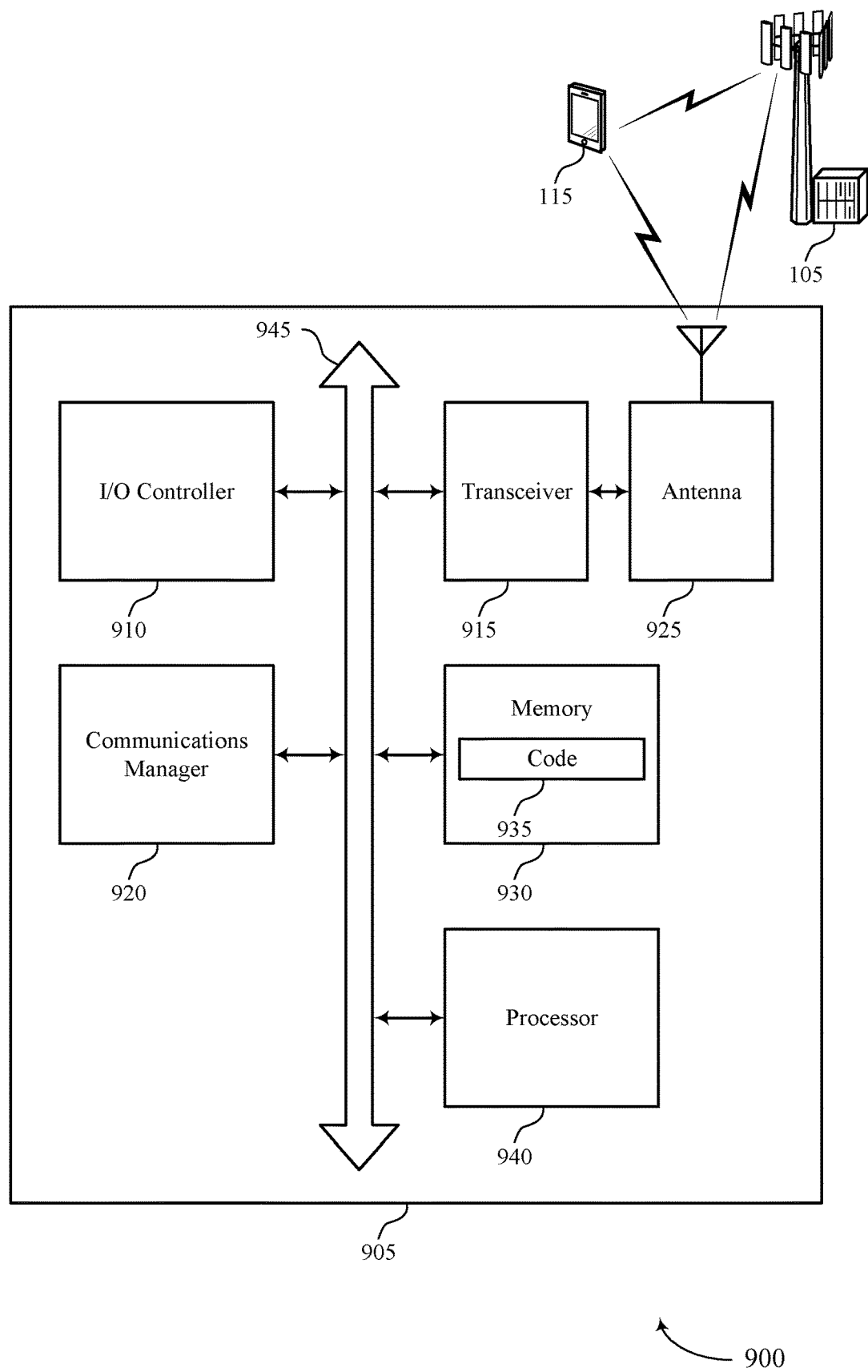
FIG. 9 shows a diagram of a system including a device that supports a modem framework for application-specific baseband customization at an end user in accordance with aspects of the present disclosure.

FIG. 9 shows a diagram of a system 900 including a device 905 that supports a modem framework for application-specific baseband customization at an end user in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting a modem framework for application-specific baseband customization at an end user). For example, the device 905 or a component of the device 905 may include a processor 940 and memory 930 coupled to the processor 940, the processor 940 and memory 930 configured to perform various functions described herein.

The communications manager 920 may support wireless communication at a first device in accordance with examples as disclosed herein. For example, the communications manager 920 may be configured as or otherwise support a means for selecting a setting for each of a set of multiple parameters associated with a device profile of the first device based on an application running on the first device. Additionally or alternatively, the communications manager 920 may be configured as or otherwise support a means for selecting settings for a set of multiple parameters associated with a device profile of the first device based on an application of the first device. The communications manager 920 may be configured as or otherwise support a means for performing a mapping procedure to map the settings for the set of multiple parameters associated with the device profile to one or more baseband configurations based on selecting the setting for each of the set of multiple parameters associated with the device profile. Additionally or alternatively, the communications manager 920 may be configured as or otherwise support a means for performing a mapping procedure to map the settings for the set of multiple parameters associated with the device profile to one or more baseband configurations based on selecting the settings for the set of multiple parameters associated with the device profile. The communications manager 920 may be configured as or otherwise support a means for communicating with a second device using the one or more baseband configurations based on performing the mapping procedure.

Additionally or alternatively, the communications manager 920 may be configured as or otherwise support a means for selecting settings for a set of multiple parameters associated with a first device based on an application running on the first device, where selecting the settings defines a device profile for the first device based on the application. The communications manager 920 may be configured as or otherwise support a means for performing a mapping procedure to map the device profile to at least one baseband configuration from a number of available baseband configurations. The communications manager 920 may be configured as or otherwise support a means for communicating with a second device using the one or more baseband configurations based on performing the mapping procedure.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of a modem framework for application-specific baseband customization at an end user as described herein, or the processor 940 and the memory 930 may be otherwise configured to perform or support such operations.

Figure 10:
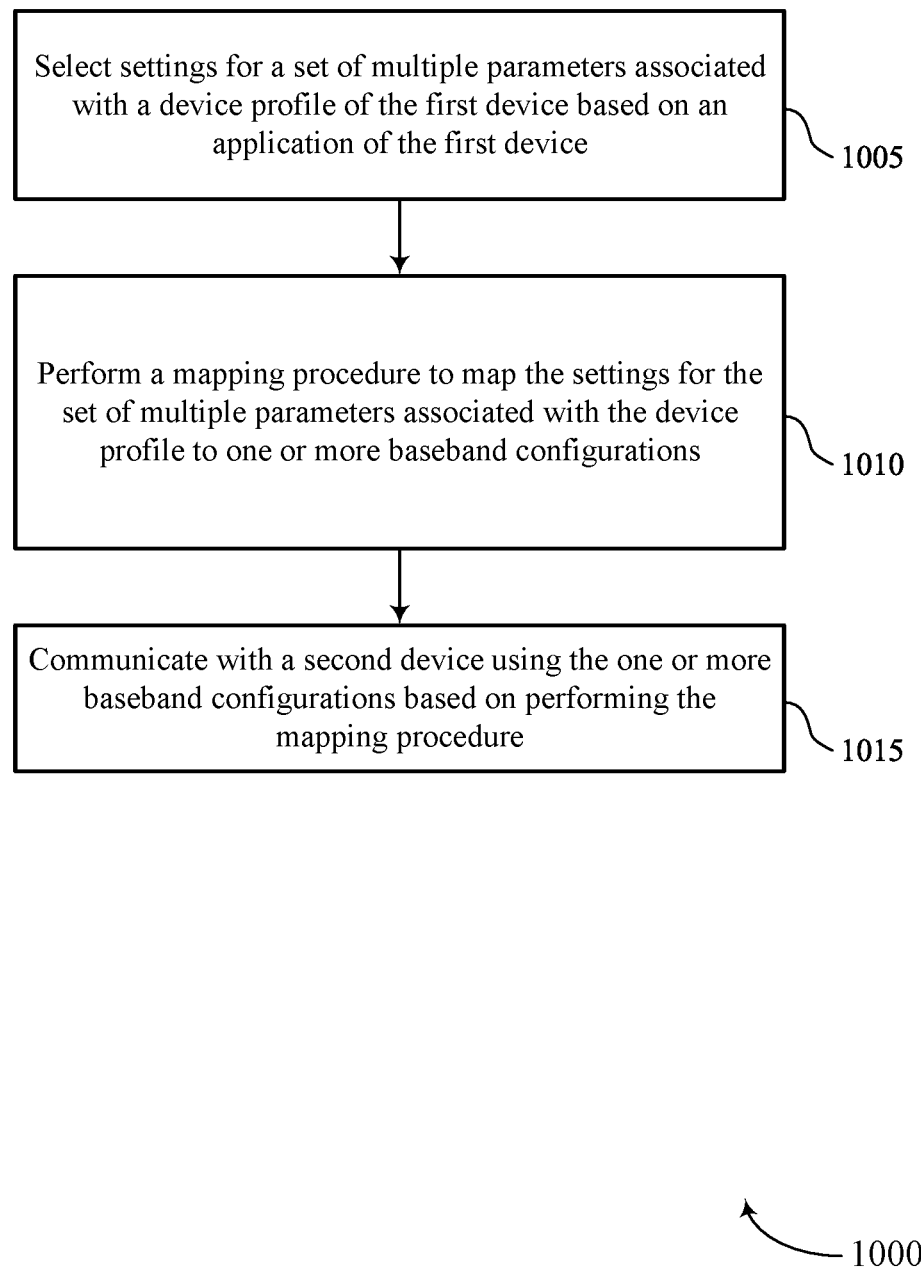
FIGS. 10 through 12 show flowcharts illustrating methods that support a modem framework for application-specific baseband customization at an end user in accordance with aspects of the present disclosure.

FIG. 10 shows a flowchart illustrating a method 1000 that supports a modem framework for application-specific baseband customization at an end user in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include selecting settings for a set of multiple parameters associated with a device profile of the first device based on an application of the first device. The operations of 1005 may be performed in accordance with examples as disclosed herein. In some examples, aspects of the operations of 1005 may be performed by a device profile component 825 as described with reference to FIG. 8.

At 1010, the method may include performing a mapping procedure to map the settings for the set of multiple parameters associated with the device profile to one or more baseband configurations. The operations of 1010 may be performed in accordance with examples as disclosed herein. In some examples, aspects of the operations of 1010 may be performed by a mapping component 830 as described with reference to FIG. 8.

At 1015, the method may include communicating with a second device using the one or more baseband configurations based on performing the mapping procedure. The operations of 1015 may be performed in accordance with examples as disclosed herein. In some examples, aspects of the operations of 1015 may be performed by a communicating component 835 as described with reference to FIG. 8.

Figure 11:
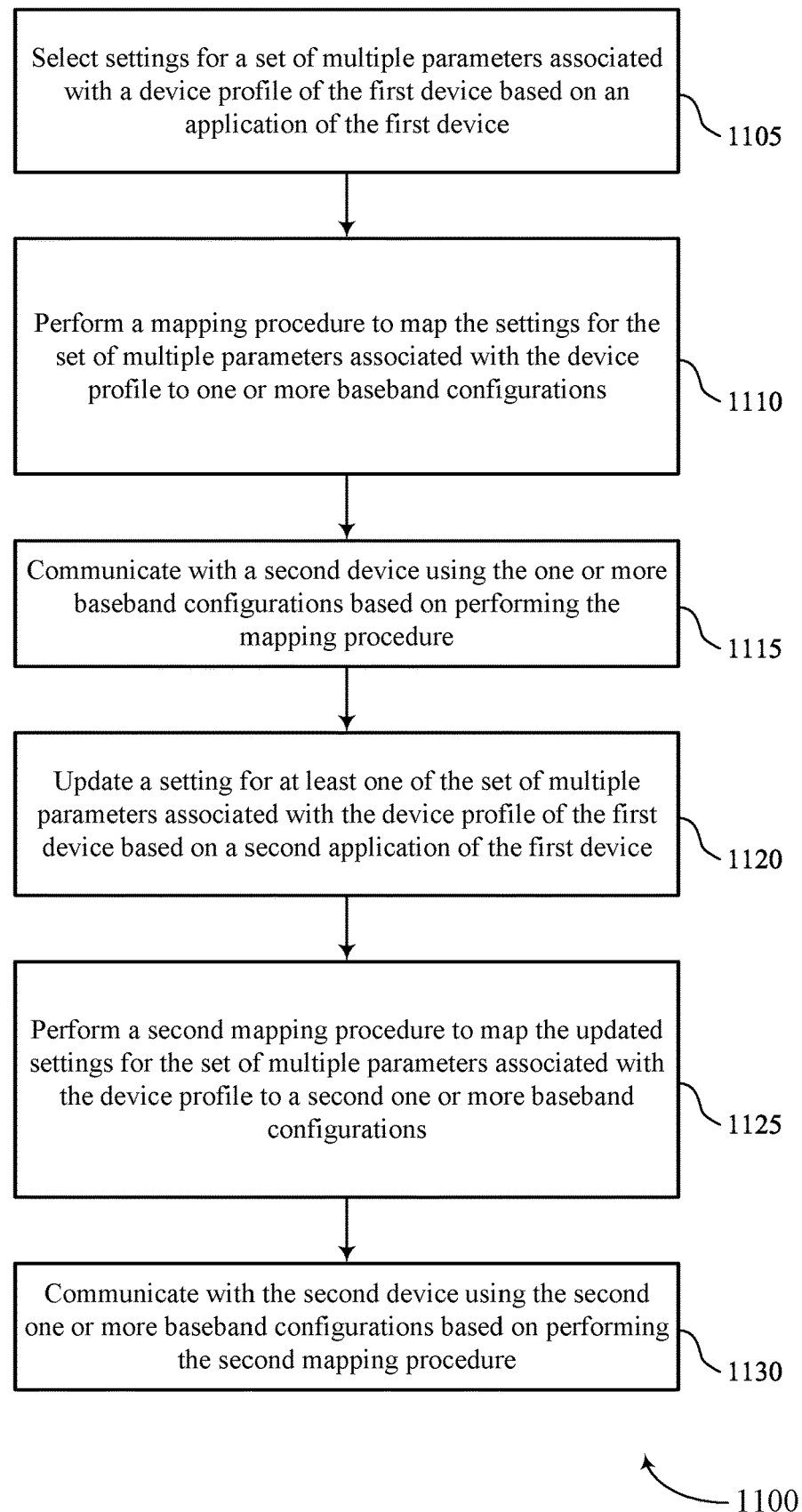

FIG. 11 shows a flowchart illustrating a method 1100 that supports a modem framework for application-specific baseband customization at an end user in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include selecting settings for a set of multiple parameters associated with a device profile of the first device based on an application of the first device. The operations of 1105 may be performed in accordance with examples as disclosed herein. In some examples, aspects of the operations of 1105 may be performed by a device profile component 825 as described with reference to FIG. 8.

At 1110, the method may include performing a mapping procedure to map the settings for the set of multiple parameters associated with the device profile to one or more baseband configurations. The operations of 1110 may be performed in accordance with examples as disclosed herein. In some examples, aspects of the operations of 1110 may be performed by a mapping component 830 as described with reference to FIG. 8.

At 1115, the method may include communicating with a second device using the one or more baseband configurations based on performing the mapping procedure. The operations of 1115 may be performed in accordance with examples as disclosed herein. In some examples, aspects of the operations of 1115 may be performed by a communicating component 835 as described with reference to FIG. 8.

At 1120, the method may include updating a setting for at least one of the set of multiple parameters associated with the device profile of the first device based on a second application of the first device. The operations of 1120 may be performed in accordance with examples as disclosed herein. In some examples, aspects of the operations of 1120 may be performed by a device profile component 825 as described with reference to FIG. 8.

At 1125, the method may include performing a second mapping procedure to map the updated settings for the set of multiple parameters associated with the device profile to a second one or more baseband configurations. The operations of 1125 may be performed in accordance with examples as disclosed herein. In some examples, aspects of the operations of 1125 may be performed by a mapping component 830 as described with reference to FIG. 8.

At 1130, the method may include communicating with the second device using the second one or more baseband configurations based on performing the second mapping procedure. The operations of 1130 may be performed in accordance with examples as disclosed herein. In some examples, aspects of the operations of 1130 may be performed by a communicating component 835 as described with reference to FIG. 8.

Figure 12:
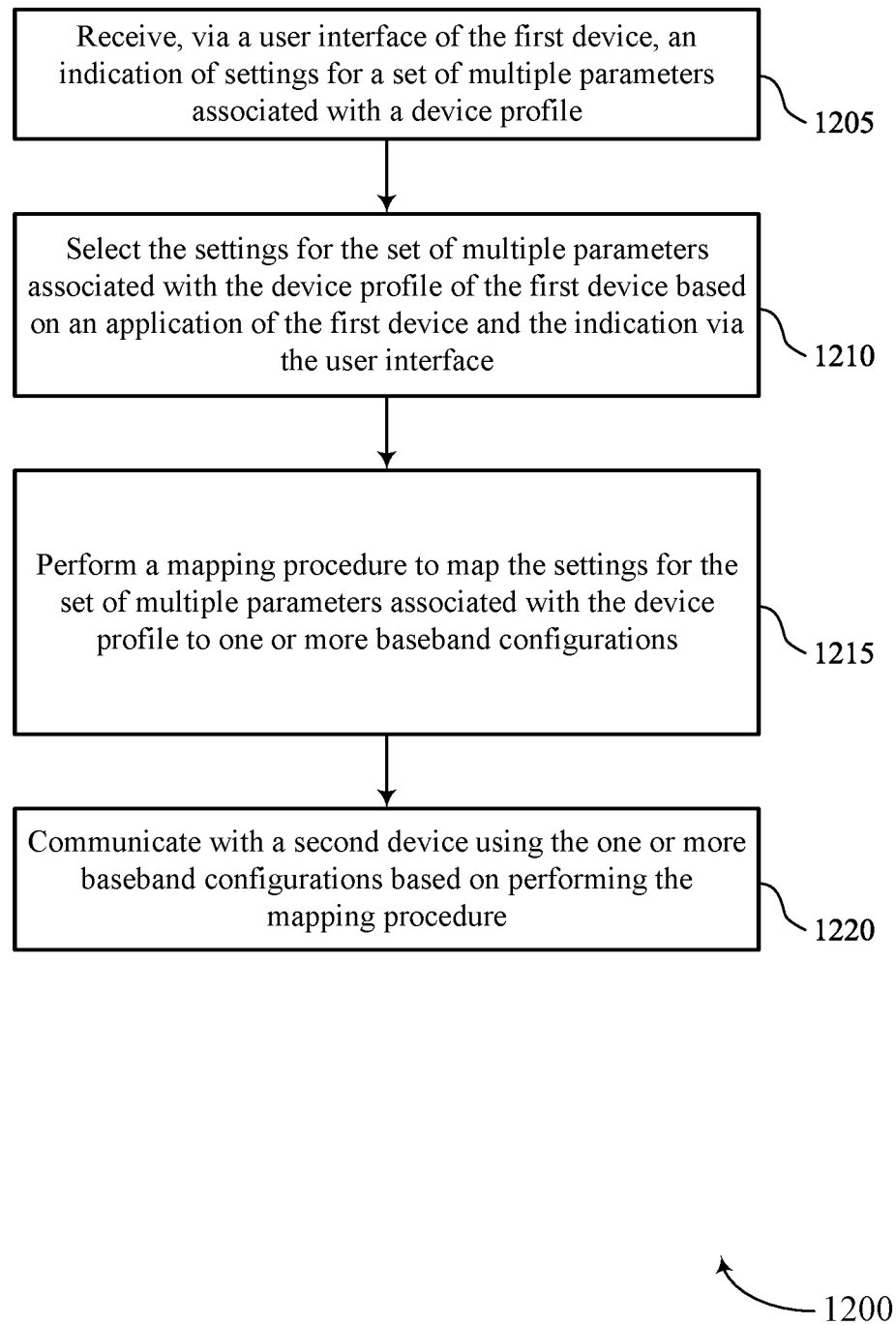

FIG. 12 shows a flowchart illustrating a method 1200 that supports a modem framework for application-specific baseband customization at an end user in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, via a user interface of the first device, an indication of settings for a set of multiple parameters associated with a device profile. The operations of 1205 may be performed in accordance with examples as disclosed herein. In some examples, aspects of the operations of 1205 may be performed by a user interface component 850 as described with reference to FIG. 8.

At 1210, the method may include selecting the settings for the set of multiple parameters associated with a device profile of the first device based on an application of the first device and the indication via the user interface. The operations of 1210 may be performed in accordance with examples as disclosed herein. In some examples, aspects of the operations of 1210 may be performed by a device profile component 825 as described with reference to FIG. 8.

At 1215, the method may include performing a mapping procedure to map the settings for the set of multiple parameters associated with the device profile to one or more baseband configurations. The operations of 1215 may be performed in accordance with examples as disclosed herein. In some examples, aspects of the operations of 1215 may be performed by a mapping component 830 as described with reference to FIG. 8.

At 1220, the method may include communicating with a second device using the one or more baseband configurations based on performing the mapping procedure. The operations of 1220 may be performed in accordance with examples as disclosed herein. In some examples, aspects of the operations of 1220 may be performed by a communicating component 835 as described with reference to FIG. 8.

The following provides an overview of aspects of the present disclosure:

Aspect 1: A method for wireless communication at a first device, comprising: selecting settings for a plurality of parameters associated with a device profile of the first device based at least in part on an application of the first device; performing a mapping procedure to map the settings for the plurality of parameters associated with the device profile to one or more baseband configurations; and communicating with a second device using the one or more baseband configurations based at least in part on performing the mapping procedure.

Aspect 2: The method of aspect 1, wherein performing the mapping procedure comprises: referencing a table indicating a correspondence between the settings for the plurality of parameters associated with the device profile and the one or more baseband configurations.

Aspect 3: The method of aspect 2, wherein the table indicates a correspondence between each permutation of settings for the plurality of parameters associated with the device profile and a unique one or more baseband configurations.

Aspect 4: The method of any of aspects 1 through 3, wherein performing the mapping procedure comprises: performing a reinforcement learning procedure to adjust a mapping of the settings for the plurality of parameters associated with the device profile to the one or more baseband configurations.

Aspect 5: The method of aspect 4, further comprising: receiving, from a modem of the first device, one or more communication metrics associated with the communicating with the second device using the one or more baseband configurations, wherein the one or more communication metrics are based at least in part on the application running on the first device, and wherein performing the mapping procedure comprises: performing the reinforcement learning procedure to adjust the mapping of the settings for the plurality of parameters associated with the device profile to the one or more baseband configurations based at least in part on the one or more communication metrics.

Aspect 6: The method of any of aspects 4 through 5, further comprising: receiving, from a modem of the first device, one or more network parameters associated with the communicating with the second device using the one or more baseband configurations, wherein performing the mapping procedure comprises: performing the reinforcement learning procedure to adjust the mapping of the settings for the plurality of parameters associated with the device profile to the one or more baseband configurations based at least in part on the one or more network parameters.

Aspect 7: The method of any of aspects 1 through 6, further comprising: updating a setting for at least one of the plurality of parameters associated with the device profile of the first device based at least in part on a second application of the first device; performing a second mapping procedure to map the updated settings for the plurality of parameters associated with the device profile to a second one or more baseband configurations; and communicating with the second device using the second one or more baseband configurations based at least in part on performing the second mapping procedure.

Aspect 8: The method of any of aspects 1 through 7, further comprising: adjusting a value for at least one of the one or more baseband configurations based at least in part on the application of the first device, wherein communicating with the second device is based at least in part on adjusting the value for the at least one of the one or more baseband configurations.

Aspect 9: The method of any of aspects 1 through 8, further comprising: receiving, via a user interface of the first device, an indication of the settings for the plurality of parameters associated with the device profile, wherein selecting the settings for the plurality of parameters associated with the device profile is based at least in part on receiving the indication.

Aspect 10: The method of any of aspects 1 through 9, wherein the settings for the plurality of parameters are selected based at least in part on an application program running on the first device.

Aspect 11: The method of any of aspects 1 through 9, wherein the plurality of parameters associated with the device profile comprise a power parameter, a performance parameter, a coverage parameter, or a mobility parameter, or any combination thereof.

Aspect 12: The method of any of aspects 1 through 11, wherein the one or more baseband configurations comprise a beam scan time, a resynchronization time, a Doppler support adjustment, an enablement or disablement of a sleep mode, a page reliability performance metric, a measurement accuracy metric, an enablement or disablement of early termination, a sleep clock source, an enablement or disablement of connected mode discontinuous reception, a modem clock plan, a transmission control protocol acknowledgement delay timer adjustment, or an idle and sleep duration timer, or any combination thereof Aspect 13: An apparatus for wireless communication at a first device, comprising a processor; memory coupled with the processor; and instructions stored in the memory and executable by the processor to cause the apparatus to perform a method of any of aspects 1 through 12.

Aspect 14: An apparatus for wireless communication at a first device, comprising at least one means for performing a method of any of aspects 1 through 12.

Aspect 15: A non-transitory computer-readable medium storing code for wireless communication at a first device, the code comprising instructions executable by a processor to perform a method of any of aspects 1 through 12.

It should be noted that the methods described herein describe possible implementations, and that the operations and the features may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example feature that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   selecting, at the first device, settings for a plurality of parameters associated with a device profile of the first device in accordance with an application of the first device;
   performing, at the first device, a mapping procedure to map the settings for the plurality of parameters associated with the device profile to one or more baseband configurations of the first device; and
   communicating with a second device using the one or more baseband configurations in accordance with performing the mapping procedure.

2. The method of claim 1, wherein performing the mapping procedure comprises:
   performing a reinforcement learning procedure to adjust a mapping of the settings for the plurality of parameters associated with the device profile to the one or more baseband configurations.

3. The method of claim 2, further comprising:
   receiving, from a modem of the first device, one or more communication metrics associated with the communicating with the second device using the one or more baseband configurations, the one or more communication metrics being associated with the application running on the first device, and performing the mapping procedure comprising:
      performing the reinforcement learning procedure to adjust the mapping of the settings for the plurality of parameters associated with the device profile to the one or more baseband configurations in accordance with the one or more communication metrics.

4. The method of claim 2, further comprising:
   receiving, from a modem of the first device, one or more network parameters associated with the communicating with the second device using the one or more baseband configurations, performing the mapping procedure comprising:
      performing the reinforcement learning procedure to adjust the mapping of the settings for the plurality of parameters associated with the device profile to the one or more baseband configurations in accordance with the one or more network parameters.

5. The method of claim 1, further comprising:
   updating, in accordance with a second application of the first device, a setting for at least one of the plurality of parameters associated with the device profile of the first device to obtain updated settings for the plurality of parameters associated with the device profile;
   performing a second mapping procedure to map the updated settings for the plurality of parameters associated with the device profile to a second one or more baseband configurations; and
   communicating with the second device using the second one or more baseband configurations in accordance with performing the second mapping procedure.

6. The method of claim 1, further comprising:
   adjusting a value for at least one of the one or more baseband configurations in accordance with the application of the first device, communicating with the second device being in accordance with adjusting the value for the at least one of the one or more baseband configurations.

7. The method of claim 1, further comprising:
   receiving, via a user interface of the first device, an indication of the settings for the plurality of parameters associated with the device profile, selecting the settings for the plurality of parameters associated with the device profile being in accordance with receiving the indication.

8. The method of claim 1, wherein the settings for the plurality of parameters are selected in accordance with an application program running on the first device.

9. The method of claim 1, wherein the plurality of parameters associated with the device profile comprises a power parameter, a performance parameter, a coverage parameter, or a mobility parameter, or any combination thereof.

10. The method of claim 1, wherein the one or more baseband configurations comprise a beam scan time, a resynchronization time, a Doppler support adjustment, an enablement or disablement of a sleep mode, a page reliability performance metric, a measurement accuracy metric, an enablement or disablement of early termination, a sleep clock source, an enablement or disablement of connected mode discontinuous reception, a modem clock plan, a transmission control protocol acknowledgement delay timer adjustment, or an idle and sleep duration timer, or any combination thereof.

11. An apparatus for wireless communication at a first device, comprising:
one or more processors; and
one or more memories coupled with the one or more processors and storing instructions executable by the one or more processors to cause the apparatus to:
select, at the first device, settings for a plurality of parameters associated with a device profile of the first device in accordance with an application of the first device;
perform, at the first device, a mapping procedure to map the settings for the plurality of parameters associated with the device profile to one or more baseband configurations of the first device; and
communicate with a second device using the one or more baseband configurations in accordance with performing the mapping procedure.

12. The apparatus of claim 11, wherein the instructions are further executable by the one or more processors to cause the apparatus to:
perform a reinforcement learning procedure to adjust a mapping of the settings for the plurality of parameters associated with the device profile to the one or more baseband configurations.

13. The apparatus of claim 12, wherein the instructions are further executable by the one or more processors to cause the apparatus to:
receive, from a modem of the first device, one or more communication metrics associated with the communicating with the second device using the one or more baseband configurations, the one or more communication metrics being associated with the application running on the first device, and the instructions being further executable by the one or more processors to cause the apparatus to:
perform the reinforcement learning procedure to adjust the mapping of the settings for the plurality of parameters associated with the device profile to the one or more baseband configurations in accordance with the one or more communication metrics.

14. The apparatus of claim 12, wherein the instructions are further executable by the one or more processors to cause the apparatus to:
receive, from a modem of the first device, one or more network parameters associated with the communicating with the second device using the one or more baseband configurations, the instructions being further executable by the one or more processors to cause the apparatus to:
perform the reinforcement learning procedure to adjust the mapping of the settings for the plurality of parameters associated with the device profile to the one or more baseband configurations in accordance with the one or more network parameters.

15. The apparatus of claim 11, wherein the instructions are further executable by the one or more processors to cause the apparatus to:
update, in accordance with a second application of the first device, a setting for at least one of the plurality of parameters associated with the device profile of the first device to obtain updated settings for the plurality of parameters associated with the device profile;
perform a second mapping procedure to map the updated settings for the plurality of parameters associated with the device profile to a second one or more baseband configurations; and
communicate with the second device using the second one or more baseband configurations in accordance with performing the second mapping procedure.

16. The apparatus of claim 11, wherein the instructions are further executable by the one or more processors to cause the apparatus to:
adjust a value for at least one of the one or more baseband configurations in accordance with the application of the first device, communicating with the second device being in accordance with adjusting the value for the at least one of the one or more baseband configurations.

17. The apparatus of claim 11, wherein the instructions are further executable by the one or more processors to cause the apparatus to:
receive, via a user interface of the first device, an indication of the settings for the plurality of parameters associated with the device profile, selecting the settings for the plurality of parameters associated with the device profile being in accordance with receiving the indication.

18. The apparatus of claim 11, wherein the plurality of parameters associated with the device profile comprises a power parameter, a performance parameter, a coverage parameter, or a mobility parameter, or any combination thereof.

19. The apparatus of claim 11, wherein the one or more baseband configurations comprise a beam scan time, a resynchronization time, a Doppler support adjustment, an enablement or disablement of a sleep mode, a page reliability performance metric, a measurement accuracy metric, an enablement or disablement of early termination, a sleep clock source, an enablement or disablement of connected mode discontinuous reception, a modem clock plan, a transmission control protocol acknowledgement delay timer adjustment, or an idle and sleep duration timer, or any combination thereof.

20. An apparatus for wireless communication at a first device, comprising:
means for selecting, at the first device, settings for a plurality of parameters associated with a device profile of the first device in accordance with an application of the first device;
means for performing, at the first device, a mapping procedure to map the settings for the plurality of parameters associated with the device profile to one or more baseband configurations of the first device; and
means for communicating with a second device using the one or more baseband configurations in accordance with performing the mapping procedure.

21. The apparatus of claim 20, wherein the means for performing the mapping procedure comprise:
means for performing a reinforcement learning procedure to adjust a mapping of the settings for the plurality of parameters associated with the device profile to the one or more baseband configurations.

22. The apparatus of claim 21, further comprising:
means for receiving, from a modem of the first device, one or more communication metrics associated with the communicating with the second device using the one or more baseband configurations, the one or more communication metrics being associated with the application running on the first device, and the means for performing the mapping procedure comprising:
  performing the reinforcement learning procedure to adjust the mapping of the settings for the plurality of parameters associated with the device profile to the one or more baseband configurations in accordance with the one or more communication metrics.

23. The apparatus of claim 21, further comprising:
means for receiving, from a modem of the first device, one or more network parameters associated with the communicating with the second device using the one or more baseband configurations, the means for performing the mapping procedure comprising:
  performing the reinforcement learning procedure to adjust the mapping of the settings for the plurality of parameters associated with the device profile to the one or more baseband configurations in accordance with the one or more network parameters.

24. The apparatus of claim 20, further comprising:
means for updating, in accordance with a second application of the first device, a setting for at least one of the plurality of parameters associated with the device profile of the first device to obtain updated settings for the plurality of parameters associated with the device profile;
means for performing a second mapping procedure to map the updated settings for the plurality of parameters associated with the device profile to a second one or more baseband configurations; and
means for communicating with the second device using the second one or more baseband configurations in accordance with performing the second mapping procedure.

25. A non-transitory computer-readable medium storing code for wireless communication at a first device, the code comprising instructions executable by one or more processors to:
  select, at the first device, settings for a plurality of parameters associated with a device profile of the first device in accordance with an application of the first device;
  perform, at the first device, a mapping procedure to map the settings for the plurality of parameters associated with the device profile to one or more baseband configurations of the first device; and
  communicate with a second device using the one or more baseband configurations in accordance with performing the mapping procedure.

* * * * *